United States Patent [19]
Sakamoto et al.

[11] Patent Number: 4,880,072
[45] Date of Patent: Nov. 14, 1989

[54] METHOD OF AND APPARATUS FOR CHECKING FOUR-WHEEL STEERING CHARACTERISTICS OF FOUR-WHEEL-STEERED VEHICLE

[75] Inventors: Shunji Sakamoto; Shigeo Okamizu; Yuji Ota; Hisaaki Katsuki, all of Hiroshima,, Japan

[73] Assignee: Mazda Motor Corporation, Japan

[21] Appl. No.: 153,431

[22] Filed: Feb. 8, 1988

[30] Foreign Application Priority Data

| Feb. 6, 1987 | [JP] | Japan | 62-25792 |
| Feb. 6, 1987 | [JP] | Japan | 62-25793 |
| Feb. 6, 1987 | [JP] | Japan | 62-25794 |
| Feb. 6, 1987 | [JP] | Japan | 62-25795 |
| Feb. 6, 1987 | [JP] | Japan | 62-25796 |
| Feb. 6, 1987 | [JP] | Japan | 62-25797 |
| Feb. 6, 1987 | [JP] | Japan | 62-25798 |
| Feb. 6, 1987 | [JP] | Japan | 62-25799 |
| Feb. 6, 1987 | [JP] | Japan | 62-25800 |
| Feb. 17, 1987 | [JP] | Japan | 62-34002 |
| Feb. 17, 1987 | [JP] | Japan | 62-34003 |
| Feb. 17, 1987 | [JP] | Japan | 62-34004 |
| Feb. 20, 1987 | [JP] | Japan | 62-37357 |
| Feb. 24, 1987 | [JP] | Japan | 62-40545 |
| Feb. 5, 1988 | [JP] | Japan | 63-25481 |

[51] Int. Cl.$^4$ .................. B62D 6/02; G01B 5/255
[52] U.S. Cl. .................. 180/140; 33/203.14; 33/288
[58] Field of Search .......... 180/140; 280/91; 33/203.14, 203.13, 203.12, 288, 600

[56] References Cited

U.S. PATENT DOCUMENTS 2,020,614 11/1935 Miller ................................ 33/203.12

FOREIGN PATENT DOCUMENTS

| 60-166561 | 8/1985 | Japan . |
| 61-18568 | 1/1986 | Japan . |
| 61-108070 | 5/1986 | Japan . |
| 62-8869 | 1/1987 | Japan . |
| 62-8871 | 1/1987 | Japan . |
| 62-8872 | 1/1987 | Japan . |
| 62-12471 | 1/1987 | Japan . |
| 62-12472 | 1/1987 | Japan . |
| 62-18367 | 1/1987 | Japan . |

Primary Examiner—John A. Pekar
Attorney, Agent, or Firm—Gerald J. Ferguson, Jr.

[57] ABSTRACT

In order to check four-wheel steering characteristics of a four-wheeled vehicle provided with a four-wheel steering system in which both the front wheels and the rear wheels are turned in response to operation of the steering wheel according to preset four-wheel steering characteristics, the steering wheel is turned to turn the front wheels and the rear wheels, and the actual turning angle of the front wheels and the actual turning angle of the rear wheels are measured, thereby detecting the actual relation between the turning angles of the front and rear wheels. Whether the actual four-wheel steering characteristics of the vehicle deviates from the preset four-wheel steering characteristics is determined through comparison of the actual relation between the turning angles of the front and rear wheels with the preset four-wheel steering characteristics.

60 Claims, 24 Drawing Sheets

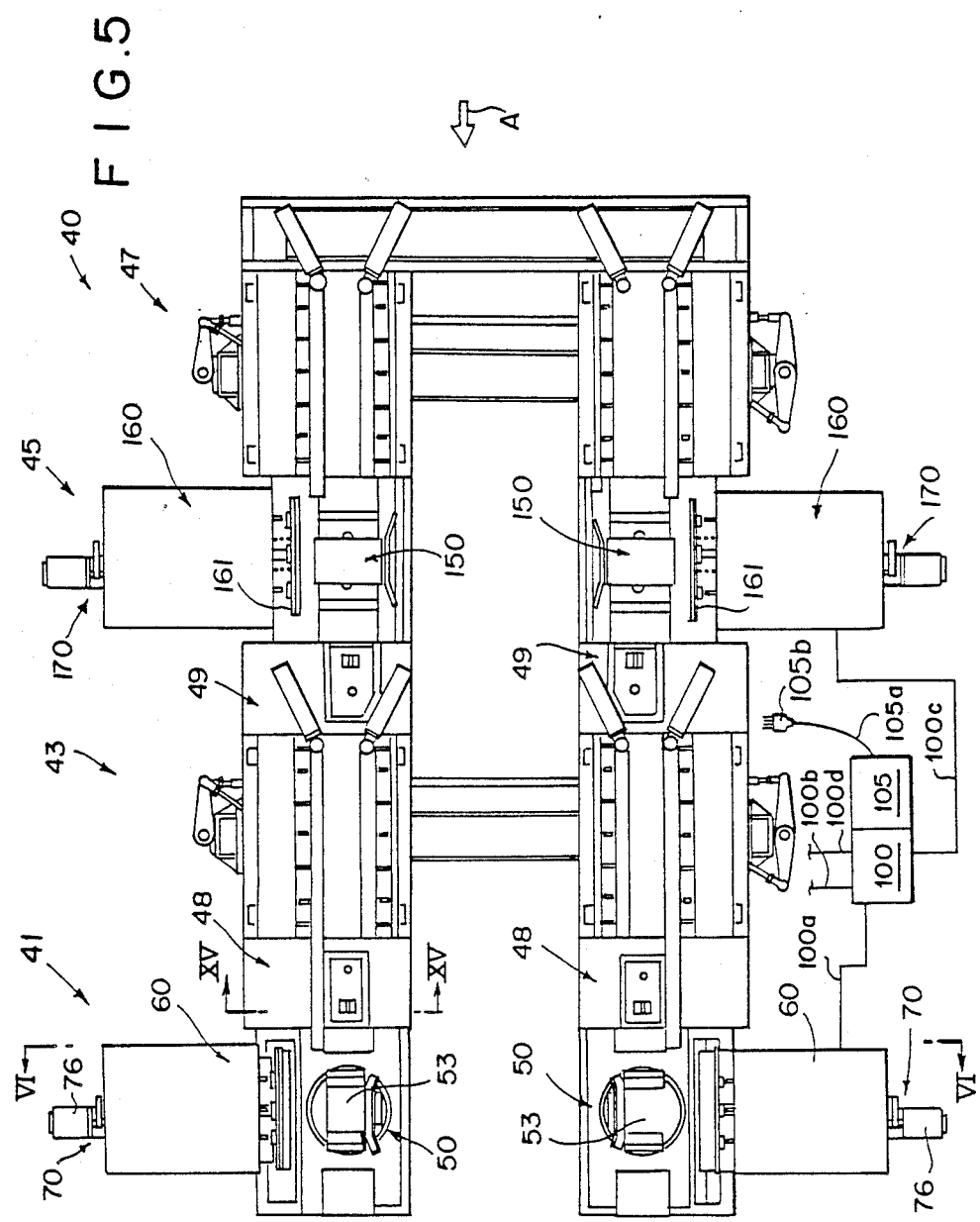

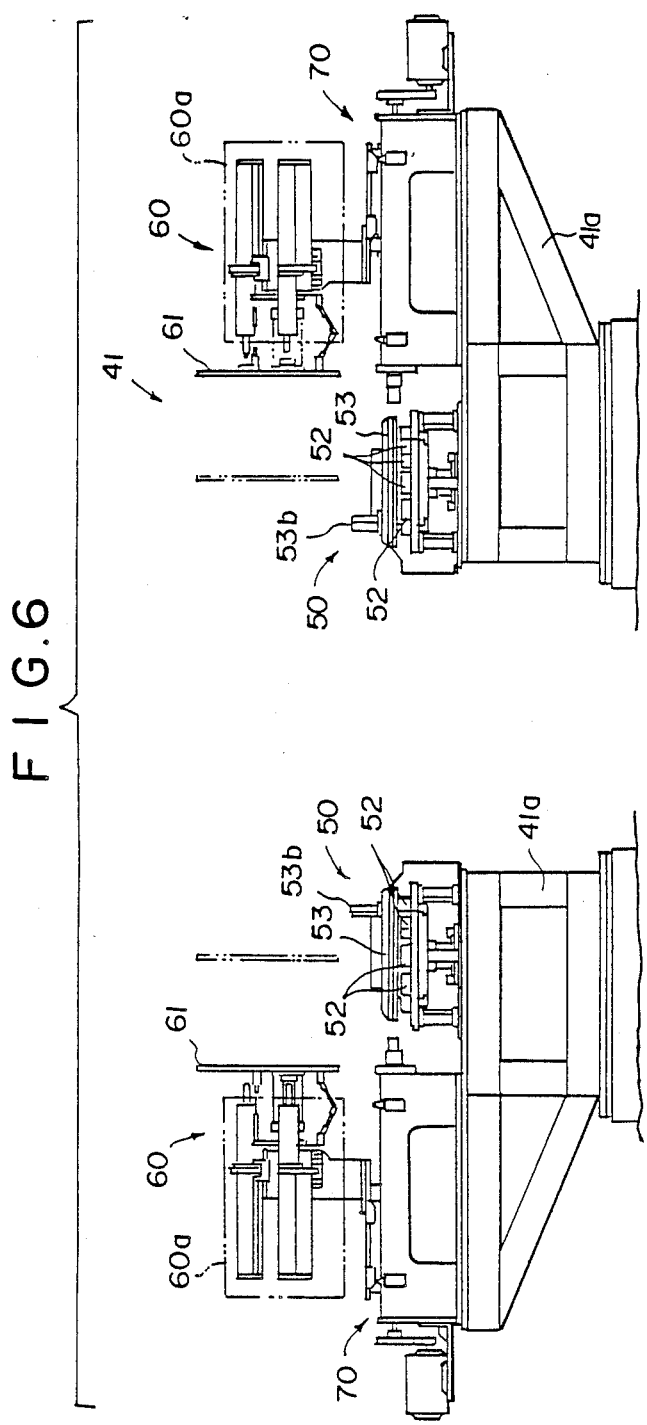

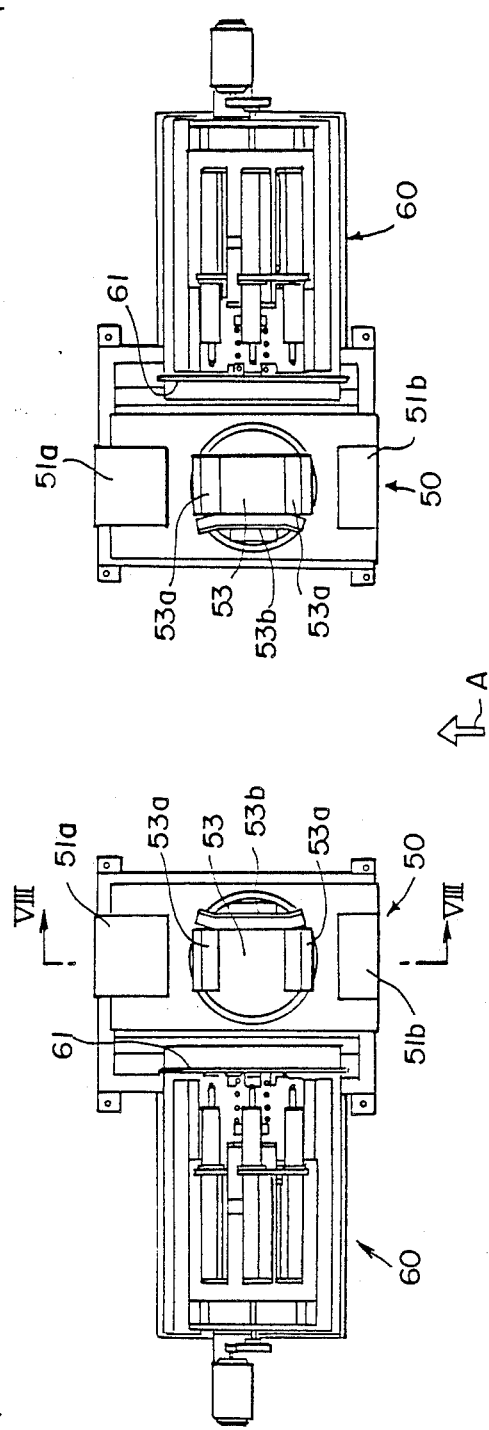

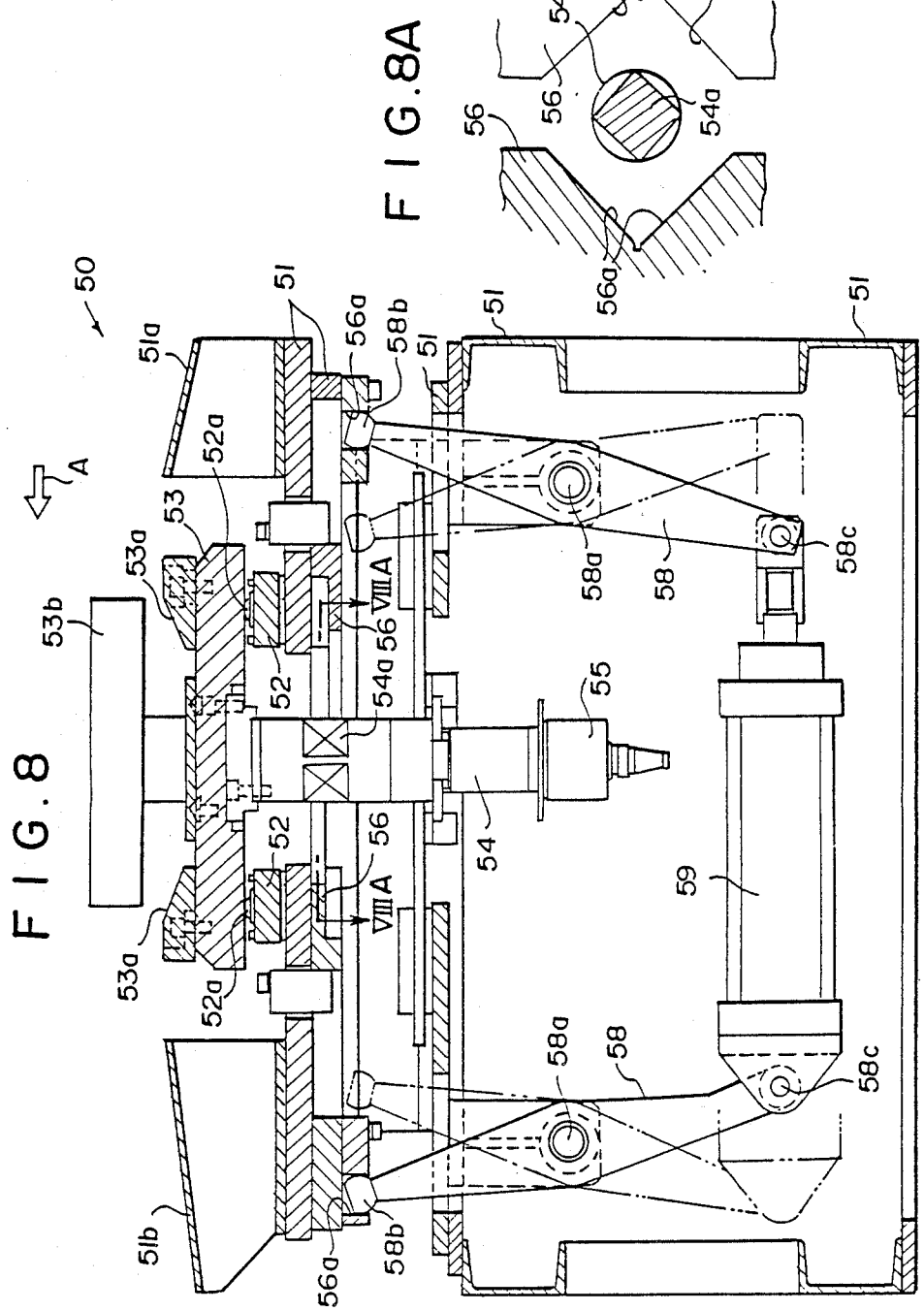

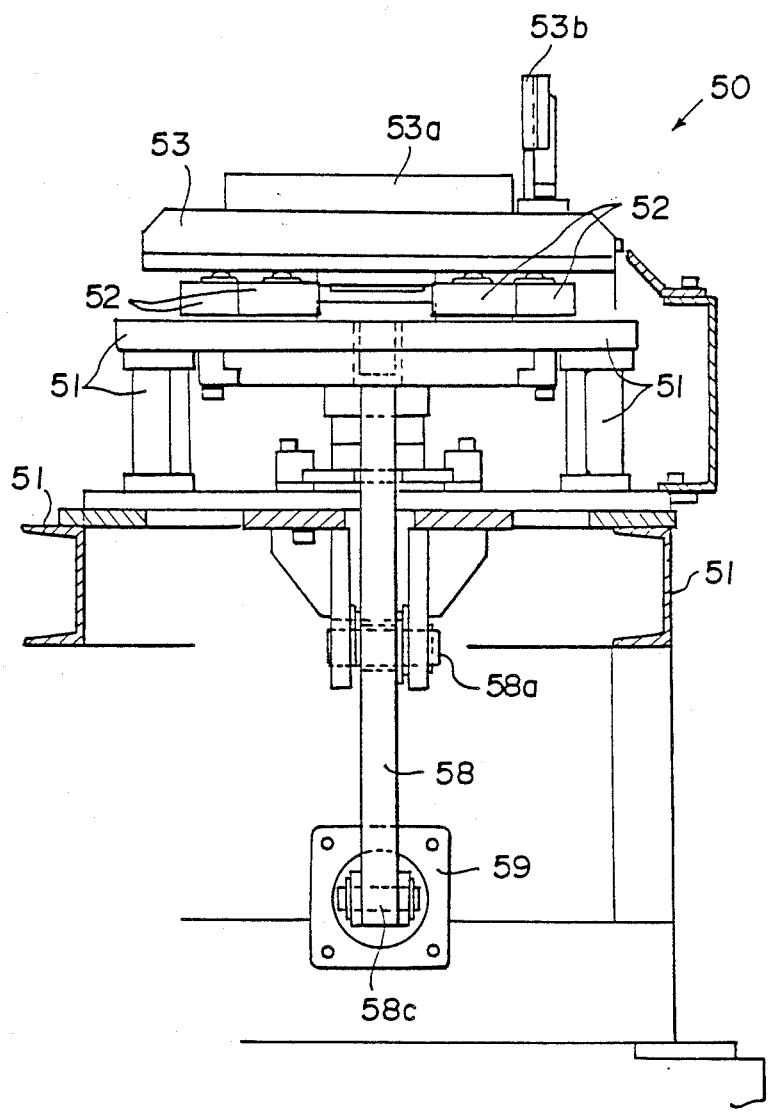

REAR WHEEL TURNING ANGLE

REAR WHEEL TURNING ANGLE

METHOD OF AND APPARATUS FOR CHECKING FOUR-WHEEL STEERING CHARACTERISTICS OF FOUR-WHEEL-STEERED VEHICLE

BACKGROUND OF THE INVENTION

1. Field of the Invention

This invention relates to a method of and an apparatus for checking the four-wheel steering characteristics of a four-wheel steering system for a vehicle in which the rear wheels are arranged to be turned in response to the turning of the front wheels when the steering wheel is turned.

2. Description of the Prior Art

There has been proposed a four-wheel steering system in which both the front wheels and the rear wheels are turned in response to operation of the steering wheel. The four-wheel steering system is advantageous over the conventional two-wheel steering system in various aspects. For example, when the rear wheels are turned in the same direction as the front wheels (same phase) during high speed travel of the vehicle, the steering performance is improved to facilitate smooth lane changing since side force simultaneously acts on both the front and rear wheels. On the other hand, when the rear wheels are turned in the direction opposite to the turning direction of the front wheels (reverse phase) during low speed travel of the vehicle, cornering performance is improved and the minimum turning radius of the vehicle is reduced.

The preferable rear wheel turning direction (the direction in which the rear wheels are turned for a given turning direction of the front wheels, that is, in the same direction, i.e., the same phase, or the reverse direction, i.e., the reverse phase) and the rear wheel turning angle ratio (the ratio of the turning angle of the rear wheels to the turning angle of the front wheels), vary depending on various factors such as the running conditions of the vehicle. (These characteristics are referred to as "the four-wheel steering characteristics", hereinbelow.) Accordingly, based on various concepts, there have been proposed various four-wheel steering systems in which the running condition of the vehicle is automatically detected and the four-wheel steering characteristics are automatically changed according to the running condition of the vehicle.

For example, it may be generally considered that the front wheels are not turned by a large angle when the vehicle runs at a high speed, and the time the front wheels are turned by a large angle is solely when the vehicle runs at a low speed. Accordingly, in one proposal, when the front wheel turning angle is relatively small, the rear wheels are turned in the same direction as the front wheels in order to, for instance, improve running stability, and when the front wheel turning angle is relatively large, the rear wheels are turned in the direction opposite to the front wheel turning direction in order to, for instance, improve cornering performance.

In another proposal, the vehicle speed is directly detected, and the four-wheel steering characteristics are controlled according to the vehicle speed.

In other proposals, load on the vehicle, torque distribution in a four-wheel drive vehicle having a torque distribution changing mechanism, inclination of the road, friction coefficient of the road, vehicle altitude, steering wheel operating speed, road gripping condition of the tires, and lateral acceleration acting on the vehicle are respectively detected and the four-wheel steering characteristics are controlled according to these factors.

Further, the rear wheel turning mechanism may be mechanically connected to the front wheel turning mechanism so that the rear wheels are turned in response to operation of the steering wheel, or the rear wheel turning mechanism is electrically controlled so that the rear wheels are turned in response to operation of the steering wheel.

See, for example, U.S. Pat. Nos. 4,552,239, 4,601,357, 4,610,328 and 4,621,702, and Japanese Unexamined Patent Publication Nos. 61(1986)-108070, 62(1987)-8869, 62(1987)-8871, 62(1987)-8872, 62(1987)-12472, 62(1987)-18367, 62(1987)-12471 and 60(1985)-166561.

In the conventional two-wheel steered vehicle, the front wheels are turned by an angle proportional to the steering wheel turning angle, and accordingly, adjustment of the normal straight-ahead position of the front wheels with respect to the neutral position of the steering wheel suffices. However, in the case of the four-wheel steered vehicle, the rear wheels are turned on the basis of predetermined four-wheel steering characteristics. Accordingly, whether the rear wheels are turned correctly on the basis of the predetermined four-wheel steering characteristics must be checked in order to ensure running stability of the vehicle.

SUMMARY OF THE INVENTION

In view of the foregoing observations and description, the primary object of the present invention is to provide a method of and an apparatus for checking the characteristics of the four-wheel steering system precisely and quickly.

In accordance with one aspect of the present invention, there is provided a method of checking four-wheel steering characteristics of a four-wheeled vehicle provided with a four-wheel steering system in which both the front wheels and the rear wheels are turned in response to operation of the steering wheel according to preset four-wheel steering characteristics, comprising steps of turning the front wheels, measuring the actual turning angle of at least one of the front wheels and the actual turning angle of at least one of the rear wheels by which the rear wheel is turned in response to the turning of the front wheels, thereby detecting the actual relation between the turning angles of the front and rear wheels, and checking whether the actual four-wheel steering characteristics of the vehicle deviate from the preset four-wheel steering characteristics by referring the actual relation between the turning angles of the front and rear wheels to the preset four-wheel steering characteristics.

In accordance with another aspect of the present invention, there is provided an apparatus for checking four-wheel steering characteristics of a four-wheeled vehicle provided with a four-wheel steering system in which both the front wheels and the rear wheels are turned in response to operation of the steering wheel according to preset four-wheel steering characteristics, comprising a front wheel turning angle measuring means for measuring the turning angle of at least one of the front wheels when the front wheels are turned, and a rear wheel turning angle measuring means for measuring the turning angle of at least one of the rear wheels by which the rear wheel is turned in response to the turning of the front wheels, and a comparator means for detecting the actual relation between the turning angles of the front and rear wheels on the basis of data input from the front wheel turning angle measuring means and the rear wheel turning angle measuring means and determining whether the actual four-wheel steering characteristics of the vehicle deviates from the preset four-wheel steering characteristics by referring the actual relation between the turning angles of the front and rear wheels to the preset four-wheel steering characteristics.

In accordance with still another aspect of the present invention, the four-wheel steering system comprises a controller for controlling turning of the rear wheels according to a signal representing the turning angle of the front wheels (that is, the turning angle of the steering wheel) and a simulating signal is input into the controller instead of actually turning the front wheels. The turning angle of the rear wheels by which the rear wheels are turned in response to input of the simulating signal into the controller is measured, and the actual relation between the turning angle of the rear wheels and the turning angle of the front wheels represented by the simulating signal is compared with the preset four-wheel steering characteristics.

BRIEF DESCRIPTION OF THE DRAWINGS

FIG. 5 is a plan view of a four-wheel steering characteristic checking apparatus in accordance with an embodiment of the present invention, FIG. 6 is a cross-sectional view taken along line VI—VI in FIG. 5 and showing the front wheel static tester employed in the apparatus shown in FIG. 5, FIG. 7 is a plan view of the front wheel static tester, FIG. 8 is a cross-sectional view taken along line VIII—VIII in FIG. 7, FIG. 8A is a fragmentary cross-sectional view taken along line VIIIA—VIIIA in FIG. 8, FIG. 9 is a side view showing the turn table for the front wheel.

DESCRIPTION OF THE PREFERRED EMBODIMENTS

Figure 1:
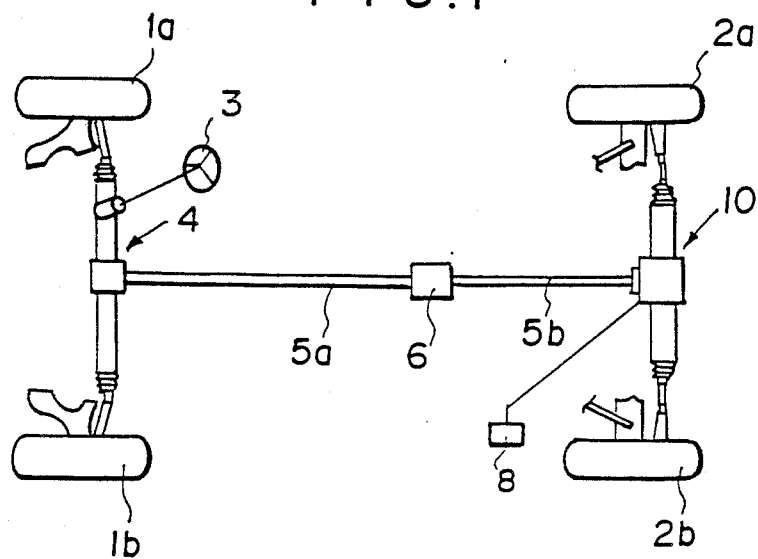
FIG. 1 is a schematic plan view showing a four-wheel steering system of a vehicle.

In FIG. 1 for illustrating a concept of the four-wheel steering system, front wheels 1a and 1b are turned by a front wheel turning mechanism 4 and rear wheels 2a and 2b are turned by a rear wheel turning mechanism 10 in response to operation of a steering wheel 3. The amount of movement of the front wheel turning mechanism 4 is delivered to the rear wheel turning mechanism 10 by way of transmission members 5a and 5b, and the four-wheel steering characteristics (the rear wheel turning phase, i.e., same phase or reverse phase, and the rear wheel turning angle ratio) are determined according to the amount of movement of the front wheel turning mechanism 10, the vehicle speed and/or other factors. The rear wheel turning mechanism 10 turns the rear wheels 2a and 2b on the basis of the four-wheel steering characteristics thus determined. The transmission members 5a and 5b are connected to each other by way of a connecting means 6, and may be shafts which mechanically transmit turning of the front wheels 1a and 1b or electrical means such as a cable which transmits the same as an electrical signal.

The present invention is directed to checking whether the front wheels and the rear wheels are actually turned according to the determined four-wheel steering characteristics.

Now, a concrete example of the four-wheel steering system to which the present invention is to be applied will be described in detail with reference to FIGS. 2 to 4.

Figure 2:
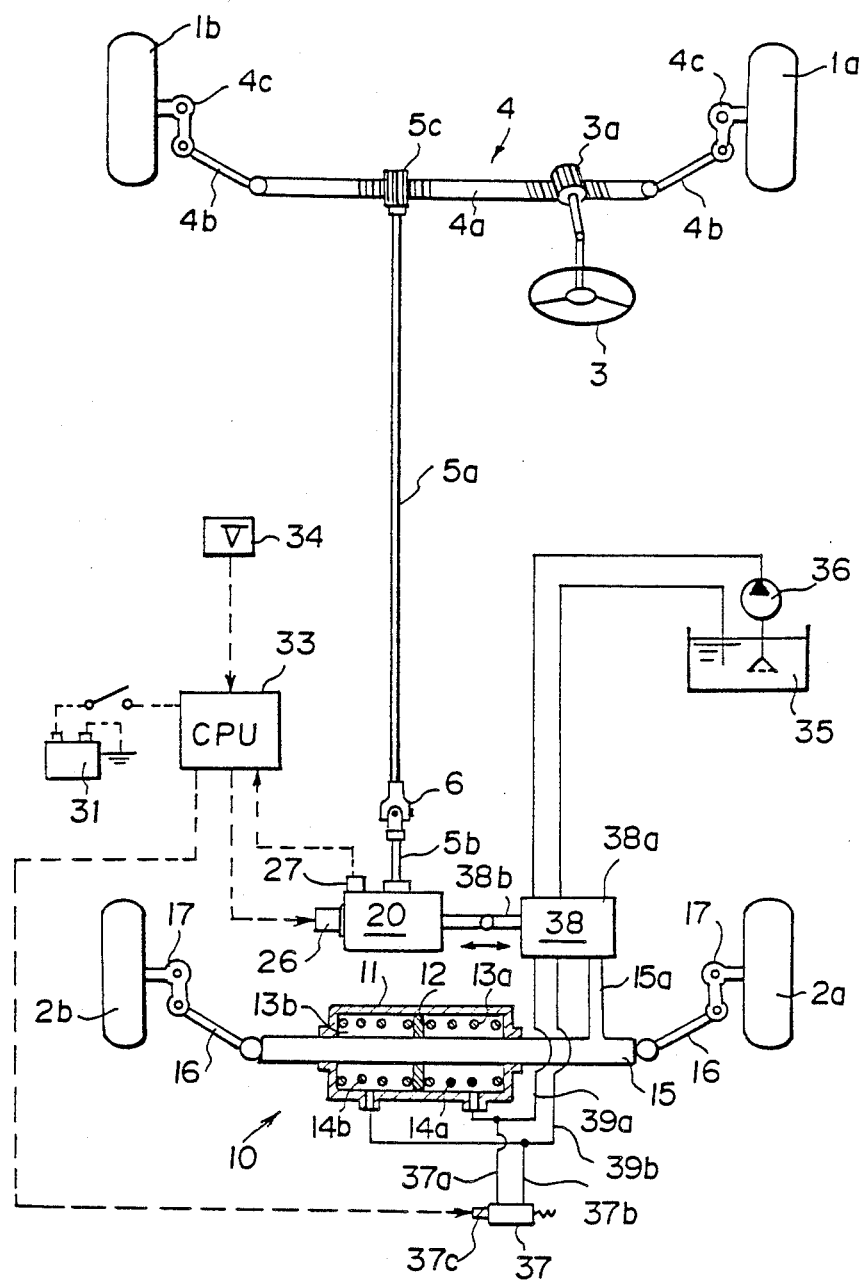
FIG. 2 is a plan view showing a concrete example of the four-wheel steering system.

In FIG. 2, the front wheel turning mechanism 4 in this particular example comprises a front wheel turning rod 4a provided with a first rack which is in mesh with a first pinion 3a on a steering shaft connected to the steering wheel 3, tie rods 4b connected to the respective ends of the front wheel turning rod 4a, and knuckle arms 4c respectively connected to the outer ends of the tie rods 4b. The front wheel turning rod 4a is moved right or left in response to operation of the steering wheel 3 to turn the front wheels 1a and 1b. The front wheel turning rod 4a is further provided with a second rack which is in mesh with a second pinion 5c formed on the front end portion of a first relay shaft (the transmission member) 5a, and when the front wheel turning rod 4a is moved right or left, the first relay shaft 5a is rotated. The rotation of the first relay shaft 5a is transmitted to a rear wheel turning angle ratio changing mechanism 20 of the rear wheel turning mechanism 10 by way of a second relay shaft 5b.

The rear wheel turning mechanism 10 includes a rear wheel turning rod 15, tie rods 16 connected to the respective ends of the rear wheel turning rod 15, and knuckle arms 17 respectively connected to the outer ends of the tie rods 16. When the rear wheel turning rod 15 is moved right or left, the rear wheels 2a and 2b are turned. The rear wheel turning rod 15 is moved by a hydraulic actuator comprising a cylinder 11 which is fixed to the vehicle body and through which the rear wheel turning rod 15 extends, and a piston 12 which is fixed to the rear wheel turning rod 15 to define left and right hydraulic pressure chambers 13a and 13b in the cylinder 11 and urged to a neutral position (straight-ahead position) by springs 14a and 14b respectively disposed in the hydraulic pressure chambers 13a and 13b. The hydraulic pressure chambers 13a and 13b are connected to a control valve 38 by way of hydraulic pressure lines 39a and 39b, and the rear wheel turning rod 15 is moved left or right under the hydraulic pressure selectively applied to the left hydraulic pressure chamber 13a or the right hydraulic pressure chamber 13b under the control of the control valve 38. Hydraulic oil in a reservoir 35 is pressurized by a pump 36 and is supplied to the control valve 38. The control valve 38 is of a known spool valve type, and comprises a tubular valve housing 38a integrally connected to the rear wheel turning rod 15 by way of an arm 15a and a spool valve 38b received in the valve housing 38a. In response to movement of the spool valve 38b in the transverse direction of the vehicle body, hydraulic pressure is selectively supplied to the left hydraulic pressure chamber 13a or the right hydraulic pressure chamber 13b to move the valve housing 38a together with the rear wheel turning rod 15 accompanying the spool valve 38b. That is, by moving the spool valve 38b, the rear wheel turning rod 15 is moved in the transverse direction of the vehicle body to turn the rear wheels 2a and 2b.

The hydraulic pressure lines 39a and 39b are communicated with a normally closed fail-safe solenoid valve 37 having a solenoid 37c respectively by way of hydraulic pressure lines 37a and 37b. When the solenoid 37c is energized to open the valve 37, the hydraulic pressures in the hydraulic pressure chambers 13a and 13b of the hydraulic actuator are equalized with each other, and the piston 12 is held in the neutral position under the force of the springs 14a and 14b, whereby the rear wheel turning angle is fixed to 0 (zero), that is, the rear wheels are fixed to the straight-ahead position irrespective of the position of the front wheels or the steering wheel.

The movement of the spool valve 38 in the transverse direction of the vehicle body is controlled by a rear wheel turning angle ratio changing mechanism 20. The rear wheel turning angle ratio changing mechanism 20 is shown in detail in FIG. 3. The rear wheel turning angle ratio changing mechanism 20 includes a U-shaped holder 21 supported by a casing (not shown) fixed to the vehicle body for pivotal motion about a support shaft 21a extending along line $l_2$ perpendicular to line $l_1$ along which the spool valve 38b is moved. A pivoted arm 22 is mounted on the holder 21 by a support pin 22a. The support pin 22a of the pivoted arm 22 extends perpendicular to the line $l_2$ at the intersection of the lines $l_1$ and $l_2$, and when the holder 21 is rotated about the support shaft 21a, an inclination angle between the support pin 22a and the line $l_1$ along which the spool valve 38b is moved, that is, the angle between the plane along which the pivoted arm 28 is moved when swung about the support pin 22a and a plane perpendicular to the line $l_1$ (which plane will be referred to as "the reference plane", hereinbelow) is changed.

Figure 3:
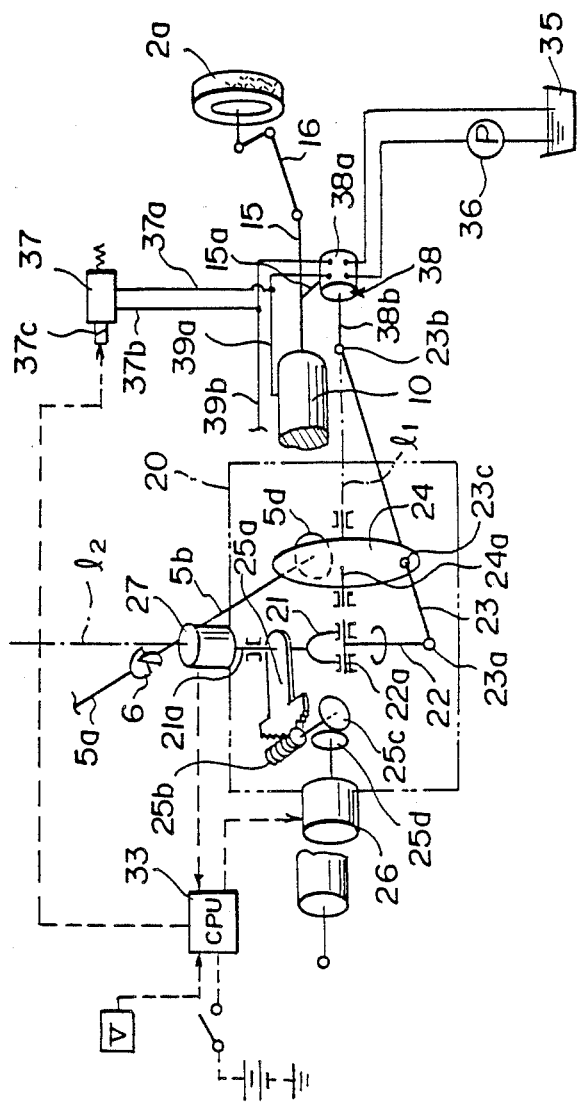
FIG. 3 is a schematic perspective view showing the rear wheel turning angle ratio changing mechanism employed in the four-wheel steering system of FIG. 2.

A connecting rod 23 is connected to the free end of the pivoted arm 22 by way of a ball joint 23a at one end and to the spool valve 38b by way of a ball joint 23b at the other end so that the spool valve 38b is moved left and right as seen in FIG. 3 when the pivoted arm 22 is swung and the free end of the pivoted arm 22 is moved left and right.

A swinging member 24 for swinging the connecting rod 23 is connected to the connecting rod 23 by way of a ball joint 23c at a portion near the ball joint 23a. The swinging member 24 comprises a bevel gear having a large diameter and supported for rotation by a support shaft 24a extending along the line $l_1$. The bevel gear is in mesh with a bevel gear 5d on the rear end of the second relay shaft 5b to transmit rotation of the steering wheel 3 to the swinging member 24.

Accordingly, the swinging member 24 and the connecting rod 23 are swung about the line $l_1$ by an amount corresponding to the turning angle of the steering wheel 3, thereby swinging the pivoted arm 22 about the support pin 22a. When the axis of the support pin 22a is aligned with the line $l_1$ along which the spool valve 38b is movable, the ball joint 23a on the free end of the pivoted arm 22 is moved in the reference plane perpendicular to the line $l_1$, and accordingly, the swinging movement of the pivoted arm 22 exerts no force on the spool valve 38b. That is, the rear wheels 2a and 2b are not turned or, in other words, the rear wheel turning angle ratio is zero in this case.

On the other hand, when the axis of the support pin 22a is inclined with respect to the line $l_1$, the ball joint 23a on the free end of the pivoted arm 22 is swung in a plane inclined with respect to the reference plane and a force pulling or pushing the spool valve 38b is exerted thereon by way of the connecting rod 23 upon operation of the steering wheel 3. That is, the amount of movement of the spool valve 38b for a given swinging angle of the pivoted arm 22 changes depending upon the inclination of the support pin 22a, i.e., the angular position of the holder 21.

A sector gear 25a is mounted on the support shaft 21a of the holder 21. A worm gear 25b is in mesh with the sector gear 25a, and a bevel gear 25c is mounted on the shaft of the worm gear 25. The bevel gear 25c is in mesh with a bevel gear 25d mounted on the output shaft of a stepping motor 26. By energizing the stepping motor 26 to rotate the sector gear 25a, thereby changing the inclination angle of the holder 21 to the reference plane, the turning angle of the rear wheels 2a and 2b, i.e., the rear wheel turning angle ratio and the turning phase, is controlled. On the support shaft 21a of the holder 21 is mounted a rear wheel turning angle ratio sensor 27 which detects the rear wheel turning angle ratio controlled by the stepping motor 26 by detecting the angular position of the sector gear 25a. The rear wheel turning angle ratio sensor 27 may comprise a potentiometer, for example.

Figure 4:
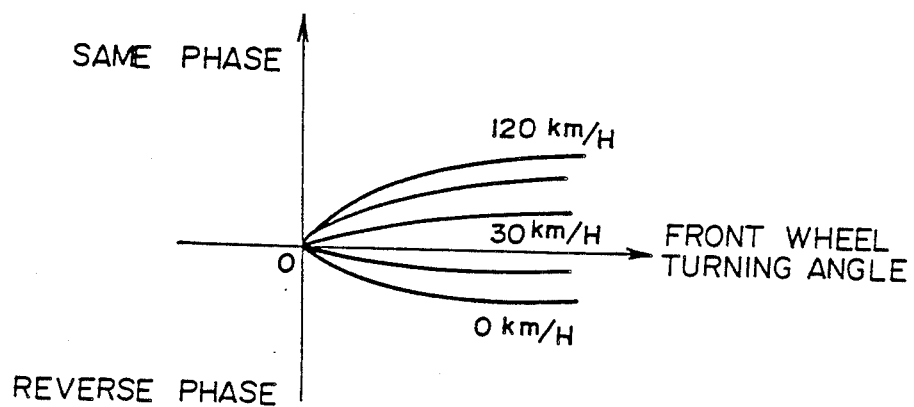
FIG. 4 is a graph showing an example of the preset four-wheel steering characteristics.

A controller (CPU) 33 which is energized by a battery 31 and receives a vehicle speed signal from a vehicle speed sensor 34 controls the stepping motor 26 to change the rear wheel turning angle ratio and the turning phase on the basis of the four-wheel steering characteristics shown in FIG. 4 in this particular example. In FIG. 4, when the rear wheels 2a and 2b are turned in the same direction as the front wheels 1a and 1b, the rear wheel turning angle ratio is defined to be positive, and when the former are turned in the direction opposite to the latter, the rear wheel turning angle ratio is defined to be negative. In accordance with the four-wheel steering characteristics shown in FIG. 4, when the vehicle speed is zero, the rear wheels are turned in the opposite direction to the front wheels and the rear wheel turning angle ratio is minimum, or in other words, the absolute value of the rear wheel turning angle ratio is maximum. When the vehicle speed is 30 Km/h, the rear wheels are not turned irrespective of the front wheel turning angle. When the vehicle speed is 120 Km/h, the rear wheels are turned in the same direction as the front wheels and the rear wheel turning angle ratio is maximum.

A four-wheel steering characteristic checking apparatus in accordance with an embodiment of the present invention will be described in detail with reference to FIGS. 5 to 20, hereinbelow. angle of toe-in of the front wheels, the front wheel turning angle and the like, a front wheel guide 43 for guiding the left and right front wheels to the front wheel static tester 41, a rear wheel static tester 45 for measuring the angle of toe-in of the rear wheels, the rear wheel turning angle and the like, and a rear wheel guide 47 for guiding the left and right rear wheels to the rear wheel static tester 45 arranged in a row. A vehicle is conveyed in the direction of arrow A to position the front wheels and the rear wheels respectively on the front wheel static tester 41 and the rear wheel static tester 45 under the guidance of the front wheel guide 43 and the rear wheel guide 47. The apparatus 40 is further provided with a simulation signal output means 105 which delivers simulation signals such as a fail signal, a vehicle speed signal and the like to the vehicle to be checked, and with a comparator means 100 which compares the actual four-wheel steering characteristics measured by this apparatus with a preset four-wheel steering characteristics. Measured values of the left and right front wheel turning angles and the left and right rear wheel turning angles are input into the comparator means 100 respectively through lines 100a to 100d. To the simulation signal output means 105 is connected a line 105a having a connector 105b adapted to be connected the controller 33 of the vehicle.

As shown in detail in FIGS. 6 and 7, the front wheel static tester 41 comprises a pair of testers which are symmetrically disposed and respectively measure the angles of toe-in and the turning angles of the left and right front wheels. Each of the tester comprises a full float type turntable 50 which is mounted on a support base 41a and supports the front wheel to be able to turn and to be movable back and forth, a front wheel angle measuring means 60 which abuts against the side surface of the front tire placed on the turntable 50 to measure the angle of toe-in, the turning angle and the like, and a tester drive means 70 which is mounted on the support base 41a and moves the front wheel angle measuring means 60 in the transverse direction of the vehicle body to bring it into abutment against the side surface of the front tire. The front wheel angle measuring means 60 has a measuring plate 61 which is adapted to abut against the side surface of the front tire, and the angle of toe-in, the turning angle and the like of the front wheel are measured by measuring corresponding inclination angles of the measuring plate 61.

As shown in detail in FIGS. 8 and 9, the turntable has a frame 51 formed of a plurality of members fixed to the support base 41a, and a plurality of bearings 52 are arranged in a circle and fixed to the top surface of the frame 1. Each of the bearings 52 has a ball 52a supported for rotation, and the balls 52a of the respective bearings 52 support a table 53 to be rotatable and to be movable left and right and back and forth. The table 53 is for supporting the front wheel placed thereon, and is provided with guides 53a for locating the front wheel in the longitudinal direction of the vehicle body and a guide 53b which is adapted to abut against the inner side surface of the front wheel to locate the front wheel in the transverse direction of the vehicle body. A rotational shaft 54 is fixed to the center of the table 53 to extend downward therefrom, and an encoder 55 for detecting the angular position of the table 53 is mounted on the lower end of the rotational shaft 54. Transfer plates 51a and 51b are provided respectively on the front and rear sides of the table 53 in order to facilitate transfer of the front wheel to the table 53. Two shaft holding plates 56 are mounted on the frame 51 to be opposed to each other on the front and rear sides of the rotational shaft 54 and to be movable back and forth. Each of the shaft holding plates 56 is connected to the upper end 58b of an arm 58 which is mounted for rotation on the frame 51 at an intermediate portion 58a. The lower portions 58c of the arm 58 connected to the respective shaft holding plates 56 are respectively connected to opposite ends of a cylinder 59 so that the shaft holding plates 56 are moved back and forth in opposite directions in response to telescopic movement of the cylinder 59. That is, when the cylinder 59 expands, the plates 56 are moved toward each other, and when the cylinder 59 contracts, the plates 56 are moved away from each other. As clearly shown in FIG. 8A, on the opposed ends of the shaft holding plates 56, there are formed recesses 56a which are right triangles in shape, and the portion 54a of the rotational shaft 54 opposed to the recesses 56a is square in cross section to conform to the recesses 56a. When the cylinder 59 expands and the plates 56 are moved toward each other, the opposed recesses 56a grip the portion 54a of the rotational shaft 54 to fix the shaft 54. In this state, the table 53 is fixed with the guides 53a directed in the longitudinal direction of the vehicle body.

Figure 10:
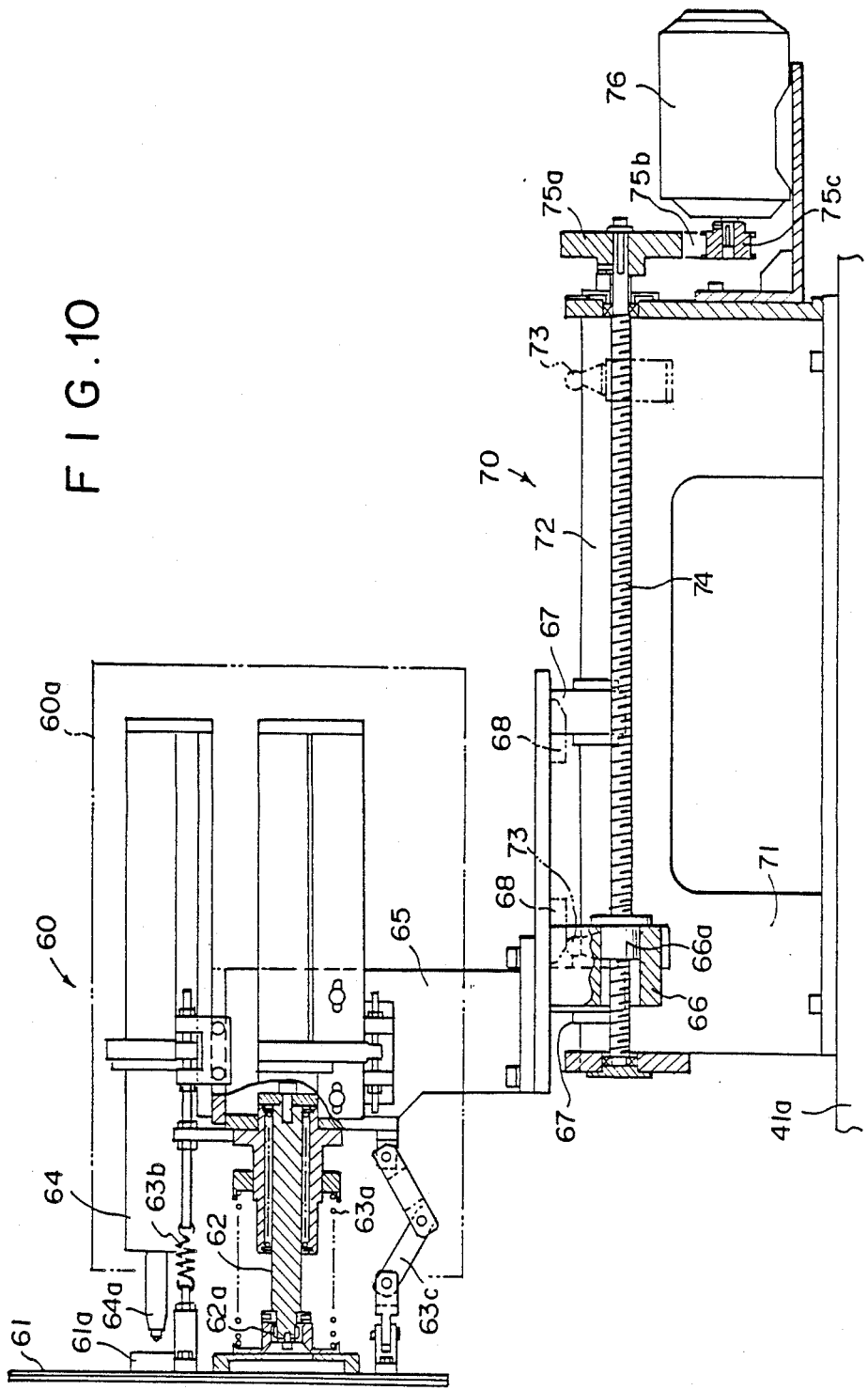
FIGS. 10 to 12 are respectively a front elevational view, a plan view and a side view showing the front wheel measuring means and the tester drive means.
Figure 11:
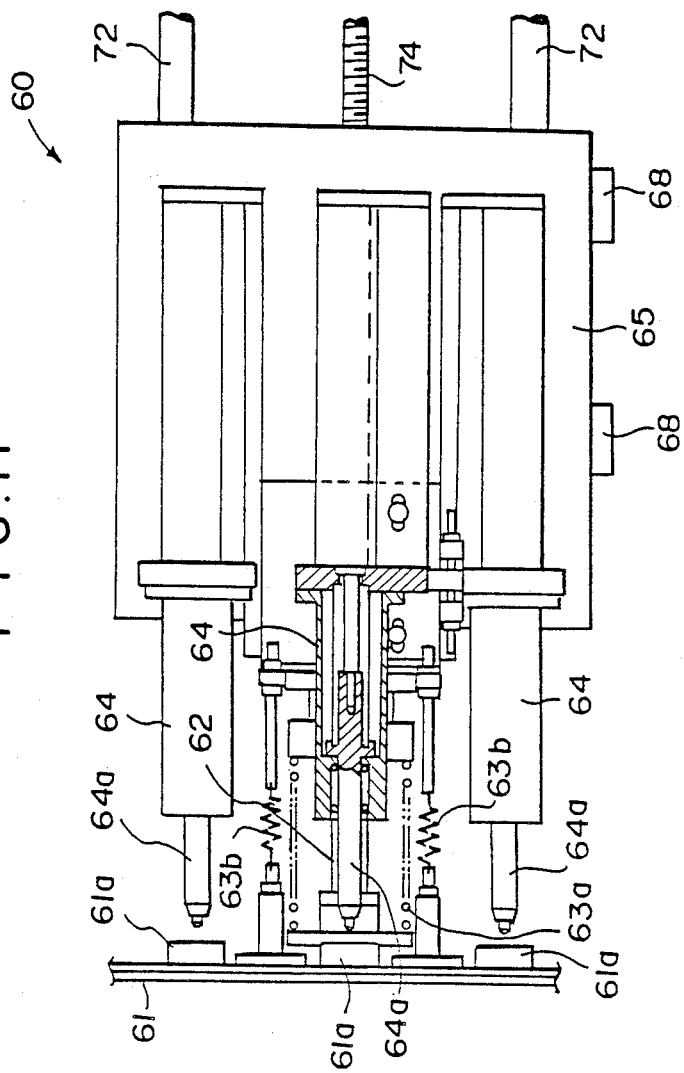
Figure 12:
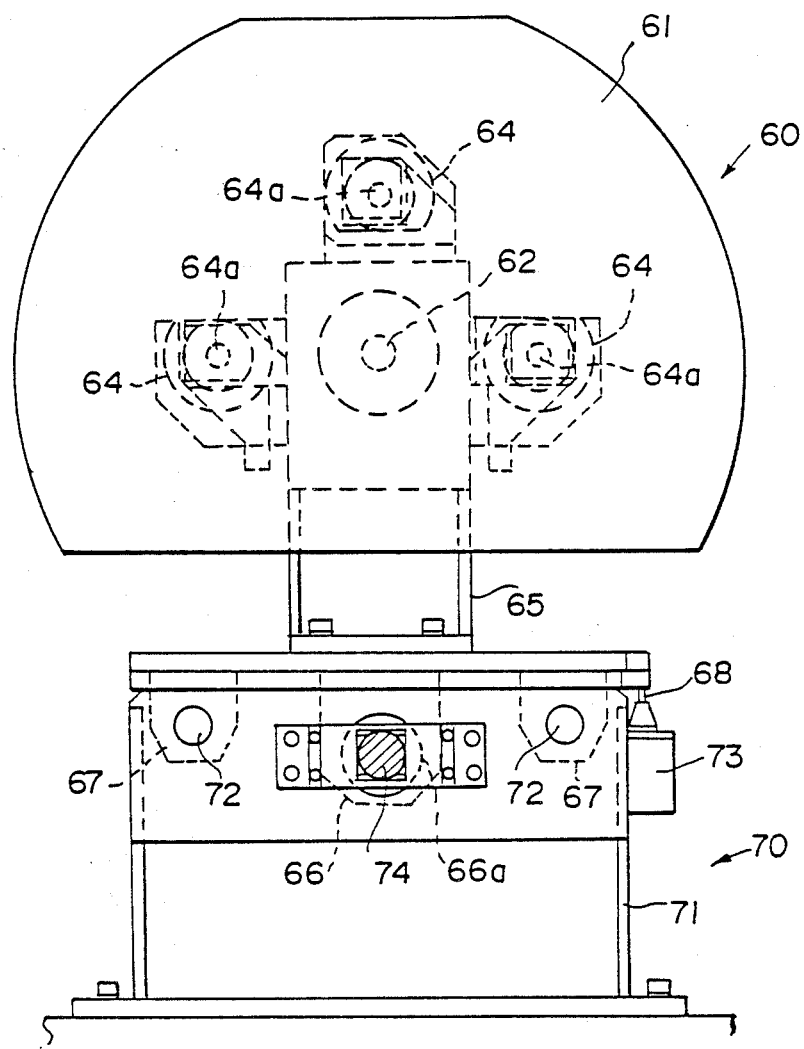

Now, referring to FIGS. 10 to 12, the front wheel angle measuring means 60 and the tester drive means 70 will be described. The front wheel angle measuring means 60 comprises a support shaft 62 mounted on a frame 65, and the measuring plate 61 is rotatably mounted on the free end of the support shaft 62 by way of a ball joint 62a. The measuring plate 61 is held in a vertically erected state by a compression spring 63a, a tensile spring 63b and link 63c. When an external force acts on the measuring plate 61, the measuring plate 61 rotates about the ball joint 62a with the springs 63a and 63b being deflected and the link 63c being deformed according to the external force acting on the measuring plate 61. That is, when the measuring plate 61 is brought into abutment against the side surface of the front tire, the measuring plate is inclined to conform to the position of the front tire, and accordingly, by measuring the inclination angles of the measuring plate 61, the angle of toe-in, turning angle, camber angle and the like can be measured. In order to measure the inclination angles, three displacement measuring devices 64 are mounted on the frame 65. The measuring devices 64 respectively have probes 64a which project toward the measuring plate 61 and are movable toward and away from the measuring plate 61. The three probes 64a are respectively disposed on the left and right sides and the upper side of the ball joint 62a. The probes 64a are adapted to abut against abutment seats 61a on the rear surface of the measuring plate 61 when the measuring plate 61 abuts against the side surface of the tire. Accordingly, inclinations of the measuring plate 61 produce differences in the amount of movement among the probes 64a, and the angle of toe-in, the turning angle, the camber angle and the like of the front wheel can be known by way of the differences. More particularly, the angle of toe-in and the turning angle of the front wheel can be measured by way of the difference in the amount of movement between the probes 64a on the left and right side of the ball joint 62a, and the camber angle can be measured by way of the average of the amounts of movement of the probes 64a on the left and right side of the ball joint 62a, and the amount of movement of the probe 64a on the upper side of the ball joint 62a. In order to adjust the angle of toe-in and to measure the turning angle, the displacement measuring device on the upper side of the ball joint 62a may be omitted. As shown by the double dotted line in FIG. 10, the displacement measuring devices 64 are covered with a cover 60a.

The front wheel angle measuring means 60 is moved back and forth by the tester drive means 70 by way of the frame 65. The tester drive means 70 has a frame 71 fixed to the support base 41a. The frame 71 supports a pair of guide rods 72 and a lead screw 74 extending between the guide rods 72. Two guide legs 67 fixedly mounted on the lower surface of the frame 65 for the front wheel measuring means 60 are fitted on the guide rods 72 for sliding movement. A conveying leg 66 having a screw bushing 66a is fixedly mounted on the lower surface of the frame 65 and the screw bushing 66a is engaged with the lead screw 74. The lead screw 74 is supported for rotation on the frame 71 and a first sprocket 75a mounted on one end of the lead screw 74 is drivingly connected by way of a chain 75b to a second sprocket 75c mounted on the output shaft of a motor 76 so that when the motor 76 is energized and the lead screw 74 is rotated, the front wheel angle measuring means 60 is moved back and forth by way of the conveying leg 60. Two limit switches 73 are mounted on the frame 71 for the tester drive means 70 spaced from each other in the longitudinal direction of the lead screw 74, and two switch plates 68 which are adapted to abut against the limit switches 73 are mounted on the frame 65 for the front wheel angle measuring means 60 in order to control the motor 76 to determine the foremost and rearmost positions of the front wheel angle measuring means 60.

Figure 13:
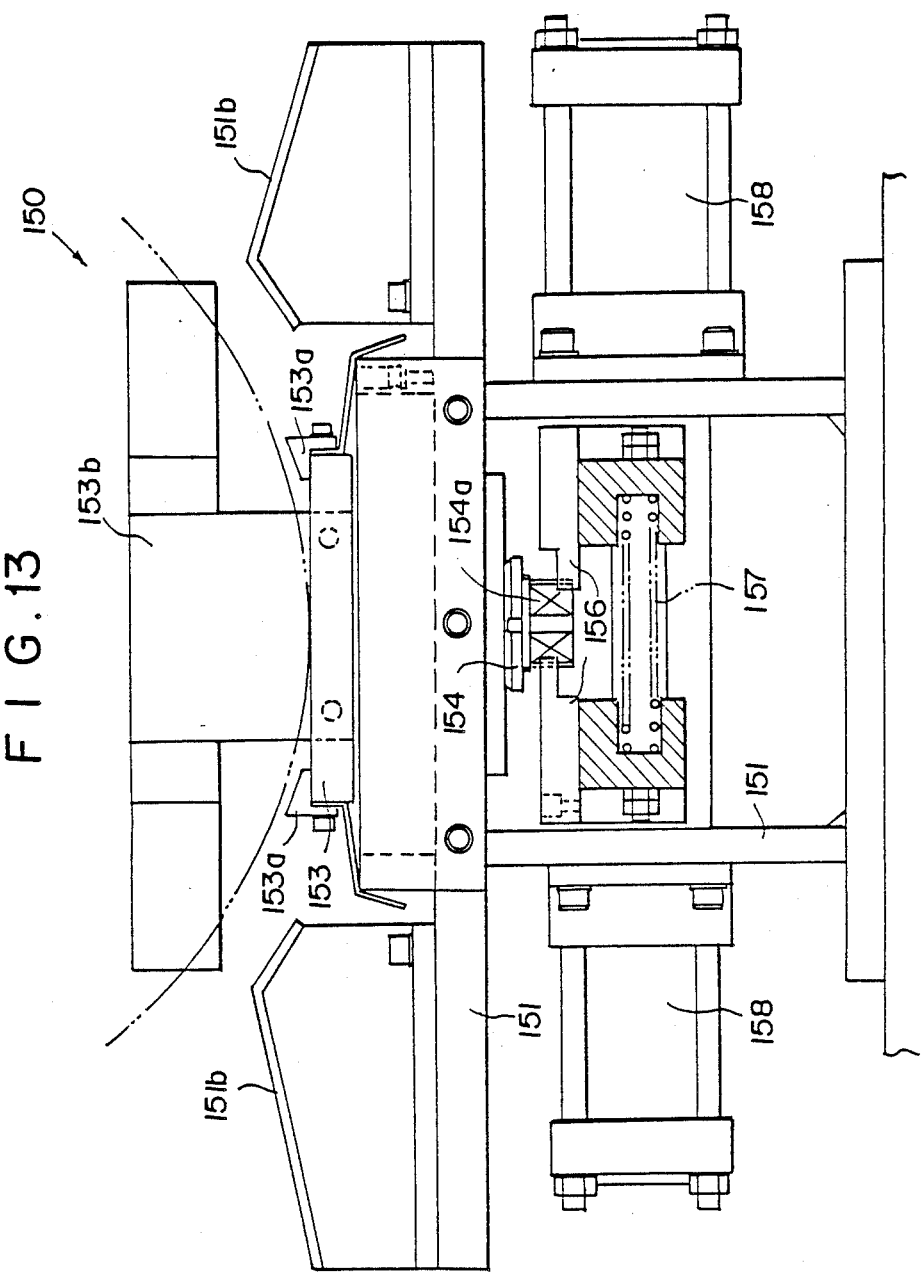
FIG. 13 is a front elevational view of the turn table for the rear wheels.

The rear wheel static tester 45 comprises a pair of testers similarly to the front static tester 41. Each of the testers of the rear wheel static tester 45 comprises a full float type turntable 150, a rear wheel angle measuring means 160 and a tester drive means 170. As shown in FIG. 13, the turntable 150 comprises a frame 151, a plurality of bearings (not shown) mounted on the frame 151, and a table 153 supported by the bearings to be rotatable and to be movable left and right and back and forth. The turntable 150 is substantially the same in structure as the turntable 50 for the front wheel though the former is somewhat different from the latter in shape. Accordingly, the turntable 150 will not be described in detail here. A rotational shaft 154 extends downward from the lower surface of the table 153. The rotational shaft 154 is shorter than the rotational shaft 54 of the table 53 for the front wheel and is not provided with an encoder unlike the rotational shaft 54 of the table 53. That is, since the front wheels are turned by a large angle, the front wheel turning angle cannot be measured solely by the front wheel angle measuring means 60, and accordingly, when the front wheel turning angle is within a range of plus or minus 5° from the straight-ahead position, the front wheel turning angle is measured with a high accuracy by the front wheel angle measuring means 60; otherwise the front wheel turning angle is measured by the encoder 55. On the other hand, as the rear wheels are turned only by a small angle, for instance 5° each side of the straight-ahead position, the rear wheel turning angle can be measured by just the rear wheel angle measuring means 160. The rotational shaft 154 has a lower end portion 154a having a square cross-section. Two shaft holding plates 156 are opposed to each other with the square lower end portion 154a of the rotational shaft 154 intervening therebetween. The shaft holding plates 156 are normally urged away from each other by a spring 157. The holding plates 156 are respectively driven by a pair of cylinders 158 toward each other, overcoming the force of the spring 157 to grip the portion 154a of the rotational shaft 154, thereby fixing the shaft 154. The rear wheel angle measuring means 160 and the tester drive means 170 of the rear wheel static tester 45 are substantially the same as those of the front wheel static tester 41, and will not be described here.

Figure 14:
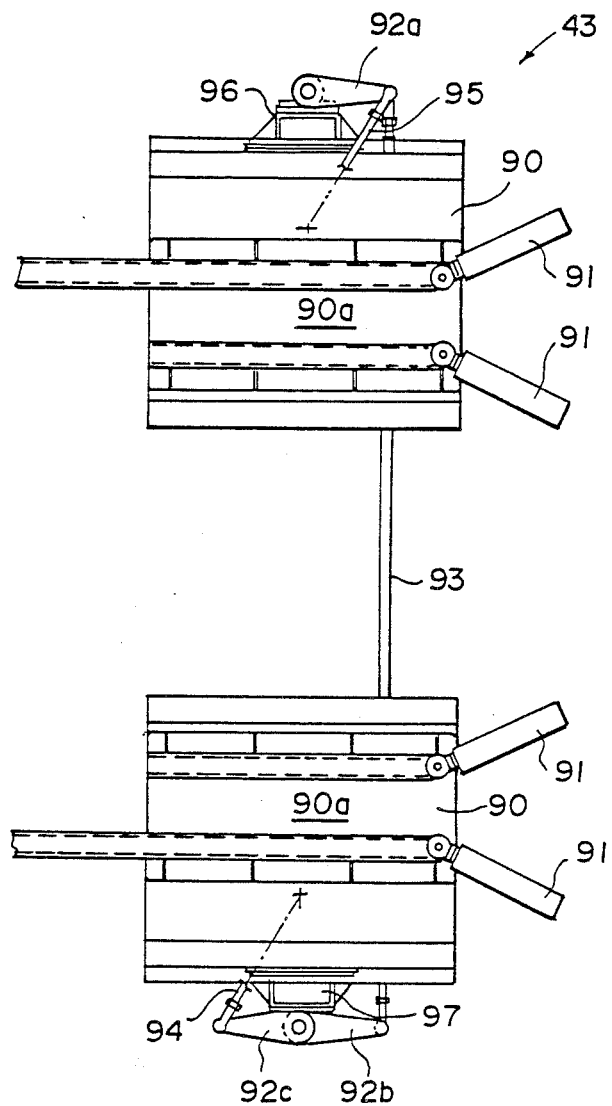
FIG. 14 is a plan view of the front wheel guide.

The front wheel guide 43 for guiding the front wheels to the front wheel static tester 41 and the rear wheel guide 47 for guiding the rear wheel static tester 45 are the same in shape and structure, and accordingly, only the front wheel guide 43 will be described, with reference to FIG. 14, hereinbelow. As shown in FIG. 14, the front wheel guide 43 includes a pair of guide members 90 respectively having guide grooves 90a for guiding the left and right front wheels to the left and right testers of the front wheel static tester 41. The guide members 90 are movable in the transverse direction of the vehicle body. Further each guide member 90 is provided with two guide plates 91 diverging away from each other in the direction opposite to the vehicle conveying direction so that the corresponding front wheel can be correctly guided to the guide groove 90a. A first arm 92a is mounted for rotation on a frame 96 opposed to the outer side surface of the right guide member 90 and a second arm 92b is mounted for rotation on a frame 97 opposed to the outer side surface of the left guide member 90. The first and second arms 92a and 92b are connected by a first connecting rod 93. The first arm 92a is connected to the right guide member 90 by a second connecting rod 95. A third arm 92c integrally formed with the second arm 92b is mounted for rotation on the frame 97 to extend forward (leftward as seen in FIG. 14) and is connected to the left guide member 90. Accordingly, by moving the first connecting rod 93 in the transverse direction by a suitable drive means such as a cylinder (not shown), the guide members 90 are transversely moved in opposite directions, whereby the distance between the guide members 90 can be changed according to the tread of the front wheels of the vehicle to be checked.

Figure 15:
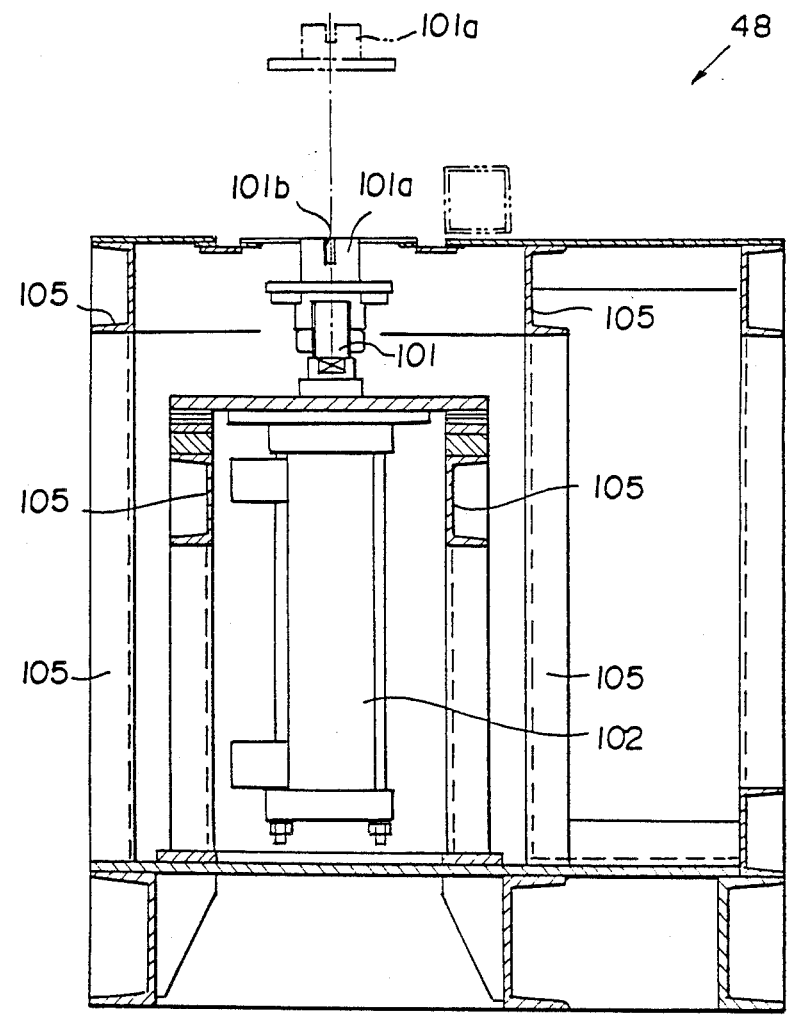
FIG. 15 is a cross-sectional view taken along line XV—XV in FIG. 5, FIGS. 16 to 19 are graphs showing examples of the relation between the measured front wheel turning angle and the measured rear wheel turning angle.

Two lifters 48 and 49 (FIG. 5) for lifting the vehicle body are respectively provided on the front and rear sides of the front wheel guide 43. As shown in FIG. 15, the lifter 48 (49) comprises a frame 105 and a cylinder 102 vertically fixed to the frame 105. The cylinder 102 has a rod 01 projecting upward, and a head 101a having a groove 101b is mounted on the top of the rod 101. When the rod 101 is moved upward, the groove 101b on the head 101a engages with the side sill of the vehicle body and the vehicle body is lifted. When an external force acts on the vehicle body in a horizontal direction while the front and rear wheels are placed on the full float type turntables, the turntables and the vehicle body are moved to adversely affect measurements by the front wheel angle measuring means and the rear wheel angle measuring means. By supporting the vehicle body applying an upward force by the lifter, movement of the vehicle body and the turn table can be prevented, and at the same time, the weight acting on the tires on the turn tables can be reduced, whereby deformation of the tires can be reduced and load on the turntables can be reduced, thereby facilitating rotation of the turntables.

When checking the four-wheel steering characteristics of a vehicle provided with the four-wheel steering system shown in FIG. 2 by use of the apparatus 40, the cylinders 59 and 158 of the front wheel turntable 50 and the rear wheel turntable 150 are first expanded to bring the shaft holding plates 56 and 156 into engagement with the rotational shafts 54 and 154, thereby fixing them, and then the vehicle is conveyed from the right side as seen in FIG. 5 in the direction of arrow A so that the front wheels 1a and 1b and the rear wheels 2a and 2b are respectively positioned on the front wheel static tester 41 and the rear wheel static tester 45 under the guidance of the front wheel guide 43 and the rear wheel guide 47. Then the lifters 48 and 49 are operated to lift the side sill of the vehicle body, thereby reducing load on the turntables 50 and 150 and holding the vehicle body so that it is not moved horizontally by an external force. Lifting of the vehicle body should be controlled so that there remains on the tables 53 and 153 such load as to smoothly rotate the tables 53 and 153 in response to turning of the front and rear wheels. Thereafter, the cylinders 59 and 158 are contracted so that the shaft holding plates 56 and 156 release the rotational shafts 54 and 154 to bring the tables 53 and 153 into a full floated state.

In this state, toe-in of the front and rear wheels is first adjusted. This adjustment is done separately on the front and rear wheels with connection of the front wheel turning mechanism 4 and the rear wheel turning mechanism 10 by way of the connecting means 6 being released. The angles of toe-in of the front and rear wheels are respectively measured by the angle measuring means 60 and 160 of the front and rear wheel static testers 41 and 45, and adjustment is made so that the angles of toe-in of the front and rear wheels when the front and rear wheels are in the respective straight-ahead positions and the steering wheel is in the neutral position become the respective predetermined values. At the same time, adjustment with respect to toe-out may be effected.

Thereafter, the front wheel turning mechanism 4 and the rear wheel turning mechanism 10 are connected with each other by way of the connecting means 6 and then the four-wheel steering characteristics are checked.

In order to check the fail-safe mechanism for fixing the rear wheels in the straight-ahead position in case of failure, the steering wheel is turned left or right by a large angle to turn the front and rear wheels by respective maximum angles. This can be accomplished by turning the steering wheel left or right by the maximum angle to turn the front wheel to the utmost, and by inputting a vehicle speed signal representing a vehicle speed at which the absolute value of the rear wheel turning angle ratio becomes maximum (e.g., 0 Km/h or 120 Km/h, see FIG. 4) into the controller 33. That is, the connector 105b of the simulation signal output means 105 is connected to the controller 33 of the vehicle instead of the vehicle speed sensor 34, and the vehicle speed signal is input into the controller 33 from the simulation signal output means 105. Thereafter, the actual front wheel turning angle and the actual rear wheel turning angle are measured respectively by the front wheel static tester 41 and the rear wheel static tester 45. In this case, since the front wheels have been turned beyond the measuring range of the front wheel angle measuring means 60, the front wheel turning angle is measured by the encoder 55 mounted on the lower end of the rotational shaft 54 of the table 53. The rear wheel turning angle is measured by the rear wheel angle measuring means 160.

Thereafter, the solenoid 37c of the fail-safe solenoid valve 37 is energized to open the valve 37, that is, the fail-safe mechanism is actuated. This can be accomplished by inputting a simulation fail signal into the controller 33 from the simulation signal output means 105. When the solenoid valve 37 is opened, the hydraulic pressures in the hydraulic pressure chambers 13a and 13b are equalized and the piston 12 is returned to the neutral position under the force of the springs 14a and 14b, and accordingly, the rear wheels are due to be fixed to the straight-ahead position (the position in which the rear wheel turning angle is 0). The rear wheel turning angle after the fail-safe mechanism is actuated is measured by the rear wheel angle measuring means 160 and it is determined by the comparator means 100 whether the rear wheel turning angle is actually 0, thereby checking whether the fail-safe mechanism has successfully operated.

In order to check whether the rear wheel turning characteristics vary depending on the turning direction of the steering wheel 3, the steering wheel 3 is turned left and right from the neutral position to turn the front wheels 1a and 1b left and right from the straight-ahead position by a relatively small angle, e.g., about plus or minus 3°. The rear wheel turning angle when the front wheels are turned in the manner described is measured. In order to facilitate measurement of the rear wheel turning angle, it is preferred that a vehicle speed signal representing a vehicle speed at which the absolute value of the rear wheel turning angle ratio becomes maximum (e.g., 0 Km/h or 120 Km/h, see FIG. 4) be input into the controller 33.

Figure 16:
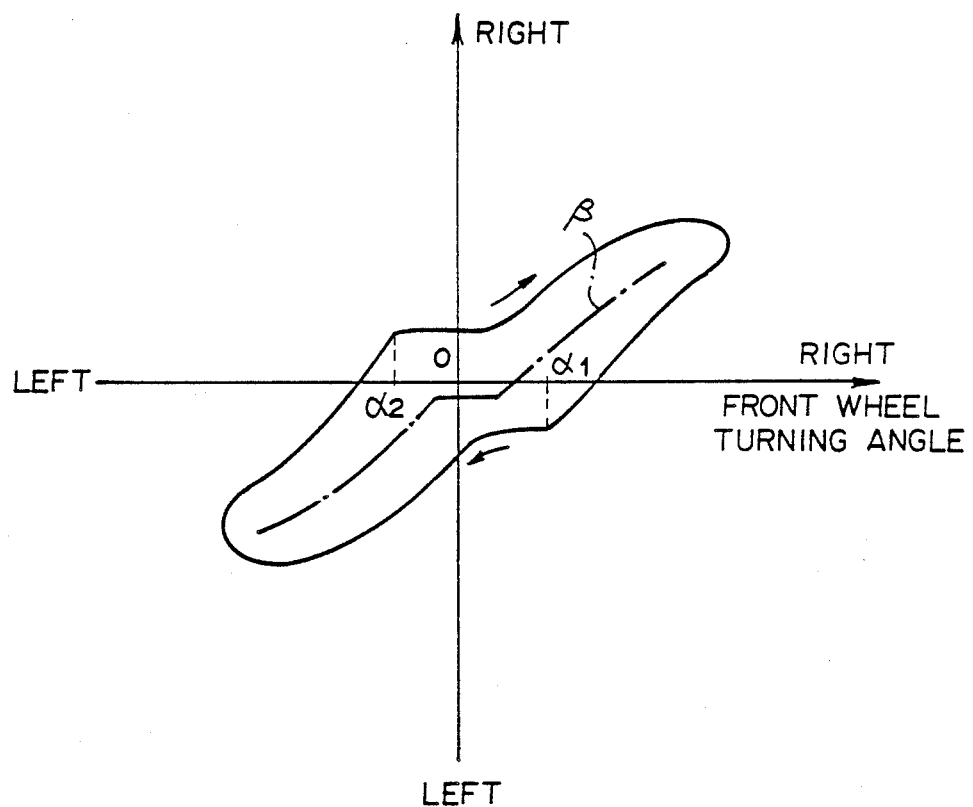

The front wheel turning angle and the rear wheel turning angle when the steering wheel is operated in the manner described above are respectively measured by the front wheel static tester 41 and the rear wheel static tester 45. When a graph of a typical example of the result of the measurement is plotted with the front wheel turning angle as the abscissa and the rear wheel turning angle as the ordinate, a trajectory having a certain hysteresis is obtained as shown in FIG. 16. This is because of backlash in the junction system of the front wheel turning mechanism and the rear wheel turning mechanism. In the four-wheel steering system shown in FIGS. 2 and 3, the springs 14a and 14b for urging the rear wheels toward the straight-ahead position are pre-compressed, and accordingly, there is produced an insensitive zone (a zone in which the trajectory is substantially parallel to the abscissa near the portion at which the front wheel turning angle becomes 0) in which the rear wheels are not turned even if the front wheels are turned. If the insensitive zone is biased left or right as seen in the graph, the rear wheel turning angle changes depending on the turning direction of the steering wheel and steering feel is adversely affected. Accordingly, the front wheel turning angles α1 and α2 at the ends of the insensitive zone are read and whether the middle between α1 and α2 becomes 0 by the comparator means 100 is checked.

Further, when the rear wheel turning angle at 0 front wheel turning angle is adjusted based on left turn or right turn of the front wheels in the case that the hysteresis is generated due to the backlash and the like, the rear wheel turning angle is deviated from the desired angle when the front wheels are turned in the other direction, thereby adversely affecting the running stability. Accordingly, whether the curve β representing the average of the trajectory obtained when the front wheels are turned left and that obtained when the front wheels are turned right passes through the origin on the graph. That is, whether the trajectory obtained when the front wheels are turned left and that obtained when the front wheels are turned right are symmetrical about the origin is checked, and the rear wheel turning mechanism is adjusted so that the curve β passes through the origin.

Figure 17:
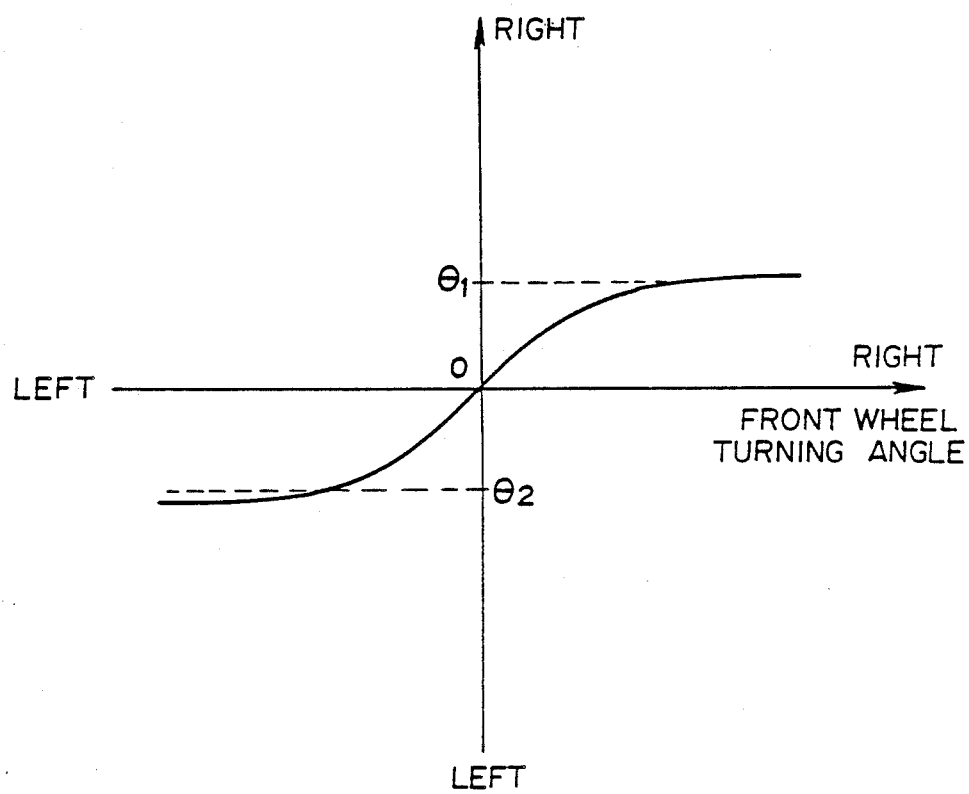

In order to check whether the rear wheel steering characteristics are changed according to the vehicle speed in a preset manner, a simulation vehicle speed signal representing a vehicle speed at which the value of the rear wheel turning ratio becomes maximum and the rear wheels are turned in the same direction as the front wheels (e.g., 120 Km/h) is input into the controller 33 from the simulation signal output means 105. In this state, the steering wheel 3 is operated to turn the front and rear wheels in the same phase, and the front wheel turning angle and the rear wheel turning angle are respectively measured by the front wheel angle measuring means 60 and the rear wheel angle measuring means 160. FIG. 17 shows an example of the relation between the measured front wheel turning angle and the measured rear wheel turning angle thus obtained with the front wheel turning angle as the abscissa and the rear wheel turning angle as the ordinate. In FIG. 17, in the region above the abscissa and the right side of the ordinate, both the front wheels and the rear wheels are turned right. As can be understood from FIG. 17, when the front wheels are turned right, also the rear wheels are turned right. However, change of the rear wheel turning angle gradually becomes small and the rear wheel turning angle cannot be larger than a predetermined angle θ1 (the right side maximum turning angle). The rear wheel turning angle varies in the same manner when the front wheels are turned left with the left side maximum angle being θ2.

Figure 18:
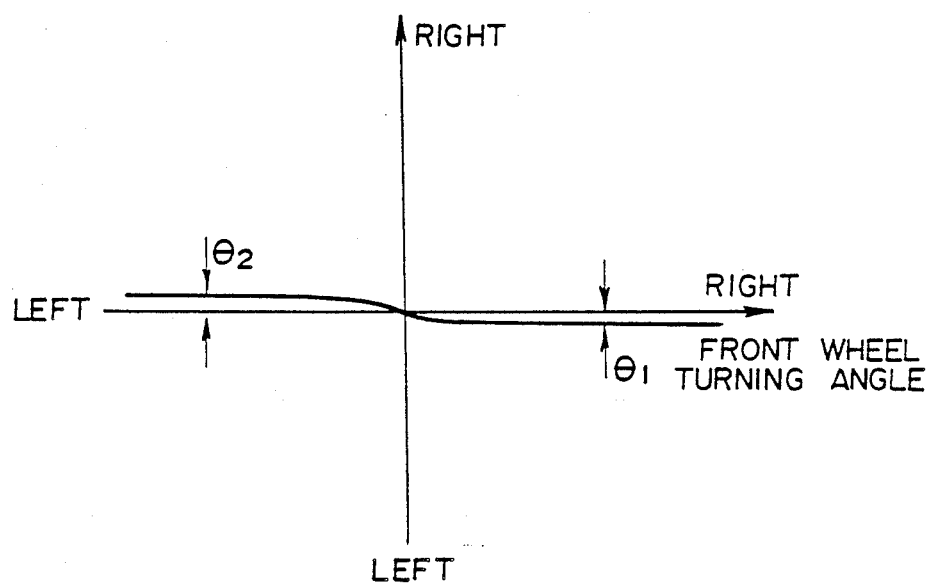

Thereafter, a simulation vehicle speed signal representing a vehicle speed at which the rear wheels are not turned irrespective of the front wheel turning angle (e.g., 30 Km/h) is input into the controller 33 from the simulation signal output means 105. When the steering wheel 3 is operated to turn the front wheels 1a and 1b in this state, the rear wheels 2a and 2b are due to be fixed to the straight-ahead position (the rear wheel turning angle is 0) and due not to be turned. The actual front wheel turning angle and the actual rear wheel turning angle are respectively measured by the angle measuring means 60 and 160 of the front and rear wheel static testers 41 and 45. FIG. 18 shows an example of the relation between the measured front wheel turning angle and the measured rear wheel turning angle thus obtained with the front wheel turning angle as the abscissa and the the rear wheel turning angle as the ordinate. As can be understood from FIG. 18, when the front wheels are turned right, the rear wheels are hardly turned irrespective of the front wheel turning angle, being turned only by a slight angle θ1 or θ2 at most which is due to errors in measurement or the like.

Figure 19:
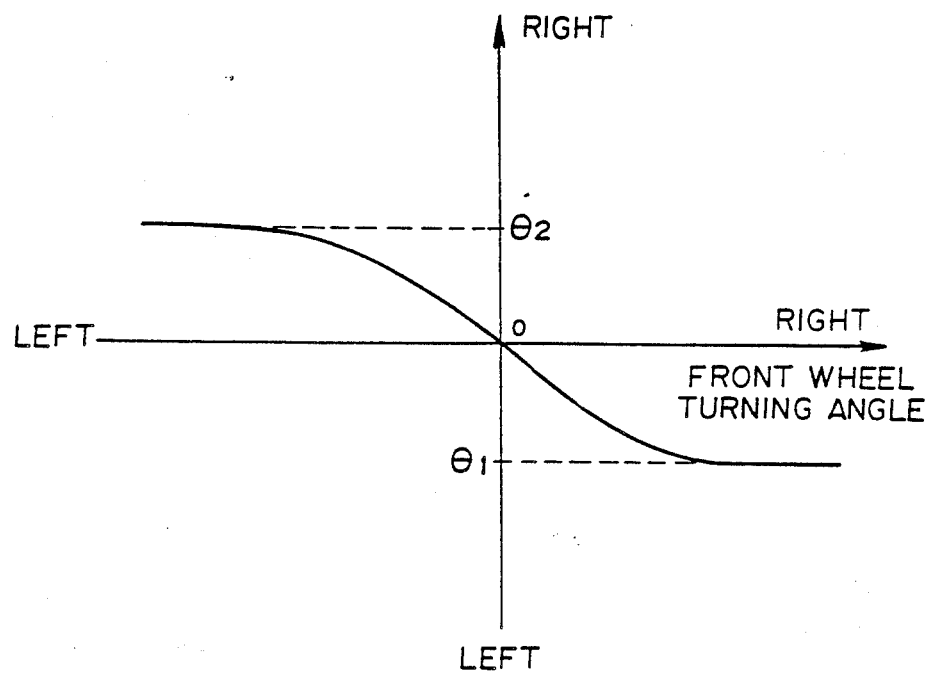

Further, a simulation vehicle speed signal representing a vehicle speed at which the value of the rear wheel turning angle ratio becomes maximum and the front and rear wheels are turned in the reverse phase (e.g., 0 Km/h) is input into the controller 33 from the simulation signal output means 105. In this state, the steering wheel 3 is operated to turn the front and rear wheels in the reverse phase, and the front wheel turning angle and the rear wheel turning angle are respectively measured by the front wheel angle measuring means 60 and the rear wheel angle measuring means 160. FIG. 19 shows an example of the relation between the measured front wheel turning angle and the measured rear wheel turning angle thus obtained with the front wheel turning angle as the abscissa and the rear wheel turning angle as the ordinate. As can be understood from FIG. 19, when the front wheels are turned right, the rear wheels are turned left. Change of the rear wheel turning angle gradually becomes small and the rear wheel turning angle cannot be larger than a predetermined angle θ1 (the left side maximum turning angle). The rear wheel turning angle varies in the same manner when the front wheels are turned left with the right side maximum angle being θ2.

The actual relation between the front wheel turning angle and the rear wheel turning angle detected for the various vehicle speed signals in the manner described above is compared with preset four-wheel steering characteristics by the comparator means 100, and whether the actual relation is deviated from the preset characteristics and whether the maximum turning angles θ1 and θ2 are in a predetermined range are checked.

Figure 20:
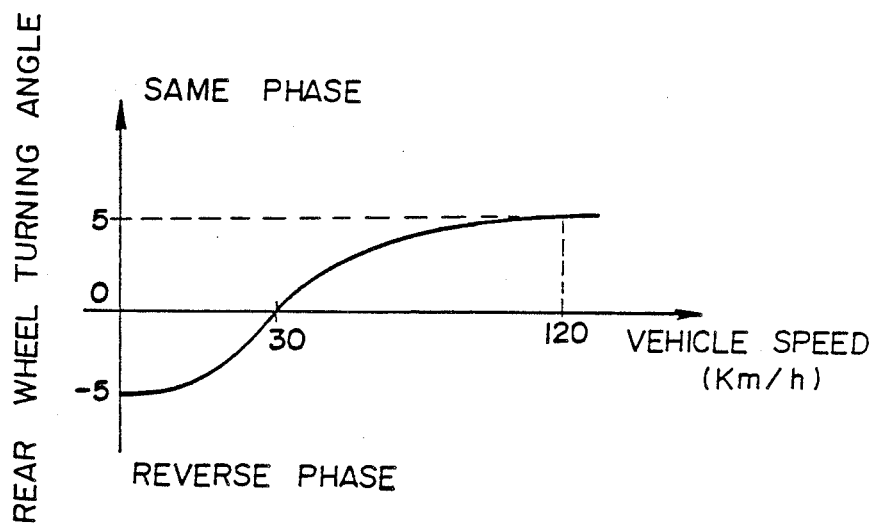
FIG. 20 is a graph showing an example of change of the measured rear wheel steering angle with vehicle speed.

In another method of checking whether the rear wheel steering characteristics are changed according to the vehicle speed in a preset manner, the steering wheel 3 is turned to turn the front wheels 1a and 1b by a large angle (preferably to the maximum) and thereafter, a simulation vehicle speed signal representing gradually increasing vehicle speed, e.g., increasing from 0 Km/h to 120 Km/h, is input into the controller 33 from the simulation signal output means 105 by way of the line 105a. The change in the rear wheel turning angle at this time is measured by the rear wheel angle measuring means 160 of the rear wheel static tester 45. FIG. 20 shows an example of the relation between the rear wheel turning angle and the vehicle speed thus obtained. In the graph shown in FIG. 20, the ordinate represents the rear wheel turning angle and the abscissa represents the vehicle speed. As can be understood from FIG. 20, when the vehicle speed is 0, the rear wheels are turned in the direction opposite to the front wheels (the reverse phase) and the maximum turning angle is 5°, and as the vehicle speed is increased in this state, the rear wheel turning angle is gradually reduced to become 0 at 30 Km/h. As the vehicle speed is further increased, the rear wheels come to be turned in the same direction as the front wheels (the same phase), and the rear wheel turning angle in the same phase is increased as the vehicle speed is increased. However, the rate of increase in the rear wheel turning angle gradually becomes small and the rear wheel turning angle reaches the maximum, i.e., 5°, at 120Km/h. The actual relation between the rear wheel turning angle ratio characteristics and the vehicle speed thus obtained is compared with the preset four-wheel steering characteristics by the comparator means 100.

Figure 21:
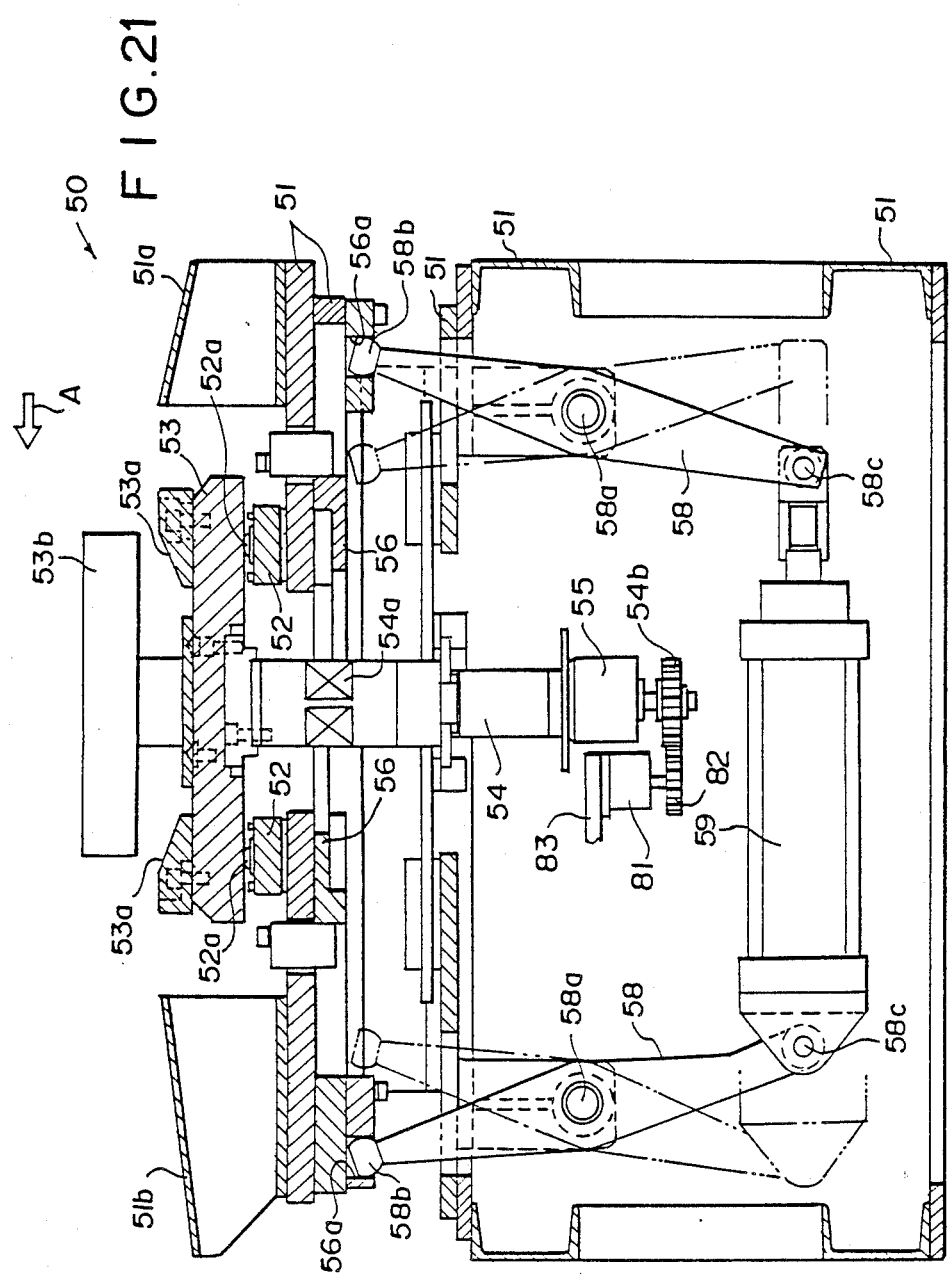
FIG. 21 is a view similar to FIG. 8 but for illustrating a modification of the apparatus shown in FIGS. 5 to 15.

Though, in the checking apparatus 40 shown in FIGS. 5 to 15, the front wheels and the rear wheels are turned by operating the steering wheels 3, the front wheels and the rear wheels may be turned by turning the table 53 of the front wheel static tester 41 as in a modification shown in FIG. 21. As shown in FIG. 21, in this modification, the rotational shaft 54 of the table 53 is provided with a driven gear 54b on the lower end thereof. The driven gear 54b is in mesh with a driving gear 82 which is driven by a motor 81. The motor 81 is supported on a support plate 83 which is movable left and right and back and forth together with the table 53 but is prevented from rotating with respect to the table 53. Thus, in this modification, the front wheels can be turned by energizing the motor 81 instead of operating the steering wheel 3. This is advantageous in that checking of the four-wheel steering characteristics can be effected without operation of the steering wheel by the operator and accordingly automation of four-wheel steering characteristic check is facilitated.

Though, in the embodiment described above, the turning angle is measured for both the left and right front wheels 1a and 1b, and for both the left and right rear wheels 2a and 2b, the turning angle may be measured only for one of the front wheels and one of the rear wheels.

Figure 22:
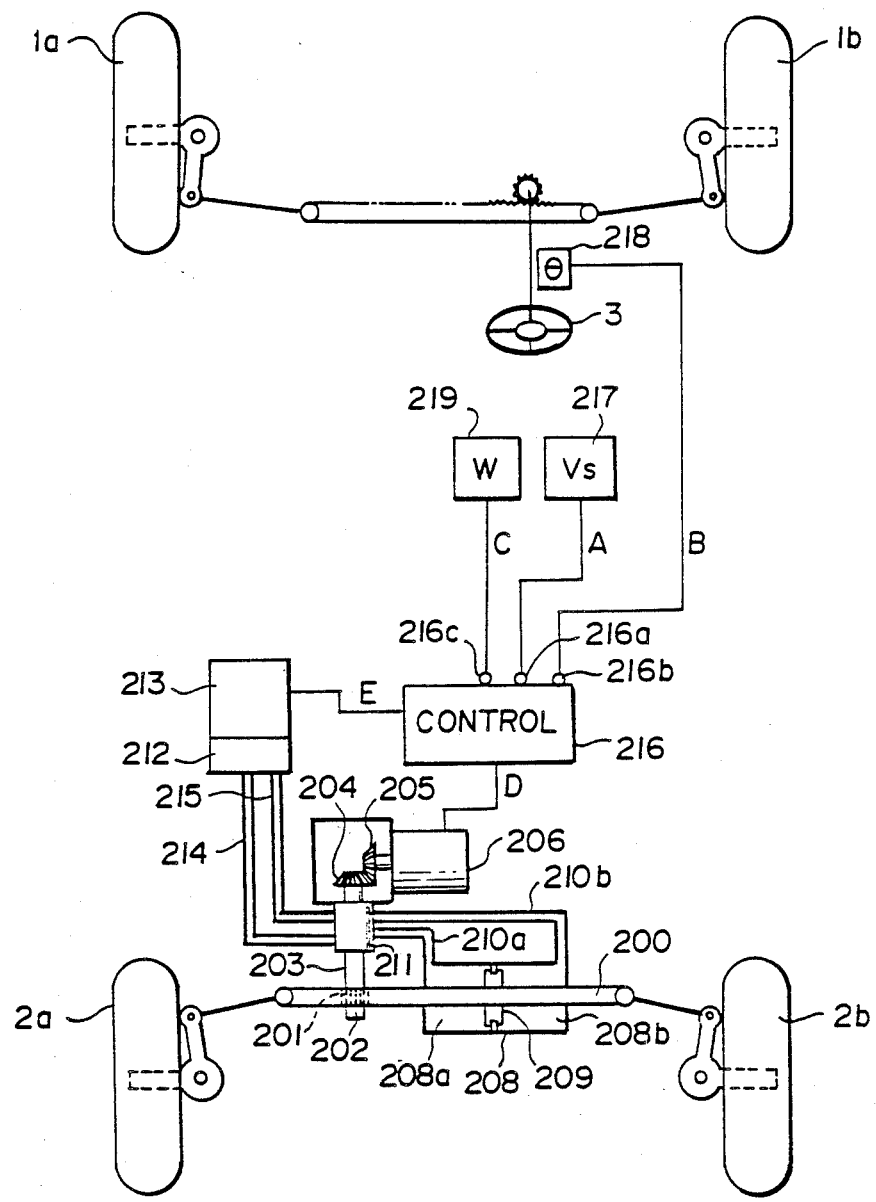
FIG. 22 is a view similar to FIG. 2 but showing another example of the four-wheel steering system.

FIG. 22 shows another example of the four-wheel steering system. In FIG. 22, the front wheels 1a and 1b are turned left and right in response to operation of the steering wheels 3 in the known manner, and the rear wheels 2a and 2b are turned left and right in response to movement of a rear wheel turning rod 200 in the transverse direction of the vehicle body. The rear wheel turning rod 200 is provided with a rack 201 which is in mesh with a pinion 202 formed on one end of a pinion rod 203. A bevel gear 204 is fixedly mounted on the other end of the rod 203 and in mesh with a bevel gear 205 fixedly mounted on the output shaft of a pulse motor 206. That is, the rear wheel turning rod 200 is moved left or right depending on the rotational direction of the pulse motor 206 by an amount corresponding to the amount of rotation of the pulse motor 206. The rear wheel turning rod 200 extends through a power cylinder 208 and is provided with a piston 209 which is fixed to the rod 200 to divide the inner space of the cylinder 208 into left and right hydraulic pressure chambers 208a and 208b. Hydraulic pressure passages 210a and 210b from a control valve 211 associated with the pinion rod 203 are respectively provided with the left and right hydraulic pressure chambers 208a and 208b. The control valve 211 is connected to a pump 212 by way of hydraulic pressure supply passage 214 and a return passage 215. The pump 212 is driven by a motor 213. The control valve 211 operates according to rotational force applied to the pinion rod 203 upon rotation of the pulse motor 206 to introduce hydraulic pressure from the pump 212 into one of the pressure chambers 208a and 208b according to the direction of the rotational force applied to the pinion rod 203 and to return the hydraulic in the other chamber to the pump 212 through the return passage 215. Thus, when the rear wheel turning rod 200 is moved in the transverse direction of the vehicle body by the pulse motor 206 by way of the bevel gears 205 and 204, the pinion rod 203, the pinion 202 and the rack 201, the hydraulic pressure selectively introduced into the pressure chambers 208a and 208b assists in the movement of the rear wheel turning rod 200.

The pulse motor 206 is controlled by a controller 216. The controller 216 has a vehicle speed signal input terminal 216a, a front wheel turning angle signal input terminal 216b and a vehicle condition signal input terminal 216c and receives a vehicle speed signal A from a vehicle speed sensor 217, a front wheel turning angle signal B from a front wheel turning angle sensor 218 and a vehicle condition signal from a vehicle condition sensor 219C, and outputs a pulse motor driving signal D and a pump driving signal E on the basis of the signals A, B and C. That is, the controller 216 determines the rear wheel turning angle taking into account the vehicle condition detected by the vehicle condition sensor 218 in addition to the front wheel turning angle and the vehicle speed.

Figure 23:
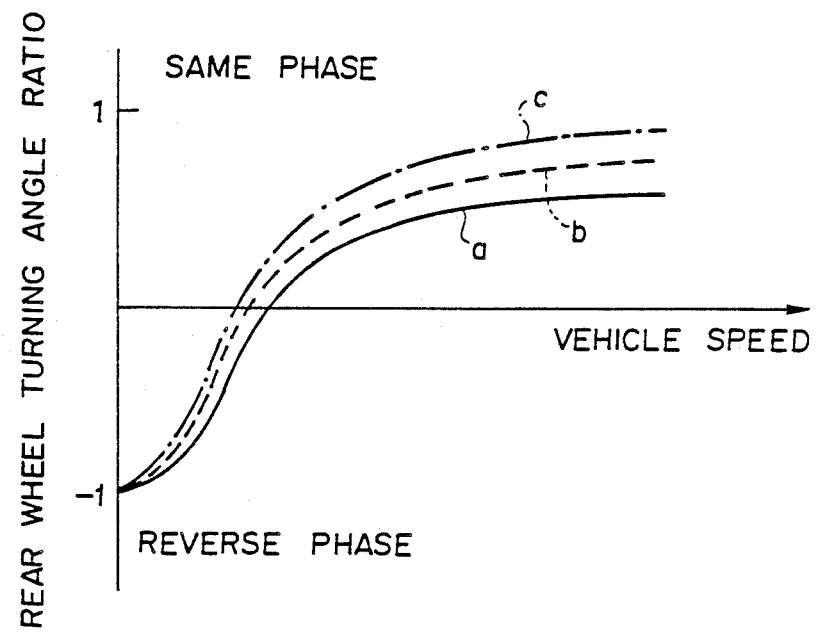
FIG. 23 is a view for illustrating an example of four-wheel steering characteristics accomplished by the four-wheel steering system shown in FIG. 22.

For example, in Japanese Unexamined Patent Publication No. 61(1986)-18568, it is proposed to change the rear wheel turning angle ratio with the vehicle speed and to change the relation between the rear wheel turning angle ratio and the vehicle speed according to the load on the vehicle so that the rear wheel turning angle ratio for a given vehicle speed is increased (when the rear wheels 2a and 2b are turned in the same direction as the front wheels 1a and 1b, the rear wheel turning angle ratio is defined to be positive, and when the former are turned in the opposite direction to the latter, the rear wheel turning angle ratio is defined to be negative; accordingly, as the absolute value is reduced when the rear wheel turning angle ratio is negative, it is considered to be increased) as the load on the vehicle is increased in order to improve the running stability. For example, as shown in FIG. 23, when the load is relatively small, the rear wheel turning angle ratio is changed with the vehicle speed in the manner shown by curve a, when the load is intermediate, the rear wheel turning angle ratio is changed with the vehicle speed in the manner shown by curve b, and when the load is heavy, the rear wheel turning angle ratio is changed with the vehicle speed in the manner shown by curve c. In such a case, a load sensor is employed as the vehicle condition sensor 219.

Further, in Japanese Unexamined Patent Publication No. 62(1987)-8869, it is proposed to change the relation between the rear wheel turning angle ratio and the vehicle speed according to the torque distribution in a vehicle having a four-wheel steering system and a four-wheel drive system with a torque distribution changing mechanism so that the sliding angle of the vehicle is constantly kept null irrespective of the torque distribution. In this case, the torque distribution selected by the torque distribution changing mechanism must be input into the controller 216 and, accordingly, a torque distribution sensor is employed as the vehicle condition sensor 219.

In Japanese Unexamined Patent Publication No. 62(1987)-8871, it is proposed to change the relation between the rear wheel turning angle ratio and the vehicle speed according to the inclination of the road so that the rear wheel turning angle ratio for a given vehicle speed is increased when the vehicle descends a slope in order to prevent side slip of the vehicle. In such a case, a descent sensor is employed as the vehicle condition sensor 219.

In Japanese Unexamined Patent Publication No. 62(1987)-8872, it is proposed to change the relation between the rear wheel turning angle ratio and the vehicle speed according to the friction coefficient of the road so that the rear wheel turning angle ratio is prevented from becoming negative irrespective of the vehicle speed when the friction coefficient of the road is low in order to prevent side slip of the wheels. In such a case, a road friction coefficient sensor is employed as the vehicle condition sensor 219.

In Japanese Unexamined Patent Publication No. 62(1987)-12472, it is proposed to change the relation between the rear wheel turning angle ratio and the vehicle speed according to the altitude of the vehicle so that the rear wheel turning angle ratio for a given vehicle speed is increased when the vehicle is at high altitude in order to improve running stability. In such a case, a vehicle altitude sensor is employed as the vehicle condition sensor 219.

In Japanese Unexamined Patent Publication No. 62(1987)-12472, it is proposed to change the relation between the rear wheel turning angle ratio and the vehicle speed according to the steering wheel operating speed so that the rear wheel turning angle ratio for a given vehicle speed is increased when the steering wheel is rotated at a high speed, and substantially uniform heading of the vehicle ca be obtained for a given turning angle of the steering wheel irrespective of the steering wheel operating speed. In such a case, a steering operating speed sensor is employed as the vehicle condition sensor 219.

In Japanese Unexamined Patent Publication No. 62(1987)-12471, it is proposed to change the relation between the rear wheel turning angle ratio and the vehicle speed according to the road gripping condition of the tires so that the rear wheel turning angle ratio for a given vehicle speed is increased when the road gripping force of the tires is weak in order to prevent side slip of the vehicle. In such a case, a road gripping force sensor is employed as the vehicle condition sensor 219.

In Japanese Unexamined Patent Publication No. 60(1985)-166561, it is proposed to reduce the rear wheel turning angle ratio within the same phase when the lateral acceleration acting on the vehicle is larger than a predetermined value in order to suppress understeer tendency produced when lateral acceleration acts on the vehicle while the front wheels and the rear wheels are turned in the same direction. In such a case, a lateral acceleration sensor is employed as the vehicle condition sensor 219.

The four-wheel steering characteristics may be controlled according to various factors other than those described above. Whatever factor is employed to control the four-wheel steering characteristics, it will be preferred that whether the four-wheel steering characteristics are controlled in the desired manner be checked. This can be accomplished by inputting a simulation signal representing the desired factor and a simulation vehicle speed signal into the controller 216 from the simulation signal output means 105 while turning the front wheel and by measuring the actual front wheel turning angle and the actual rear wheel turning angle respectively by the front wheel angle measuring means 60 and the rear wheel angle measuring means 160, and by comparing the actual relation between the front wheel turning angle and the rear wheel turning angle with the preset four-wheel characteristics by the comparator means 100.

In the above description, the front wheels are actually turned and the front wheel turning angle is actually measured, but when the front wheel turning mechanism is not mechanically connected to the rear wheel turning mechanism and turning of the front wheels is transmitted to the rear wheel turning mechanism as an electrical signal as in the four-wheel steering system shown in FIG. 22, a simulation signal representing a front wheel steering angle may be input into the controller of the four-wheel steering system and the value of the front wheel turning angle represented by the simulation signal may be used for calculating the actual relation between the front wheel turning angle and the rear wheel turning angle instead of actually turning the front wheel and measuring the actual front wheel turning angle.

Figure 24:
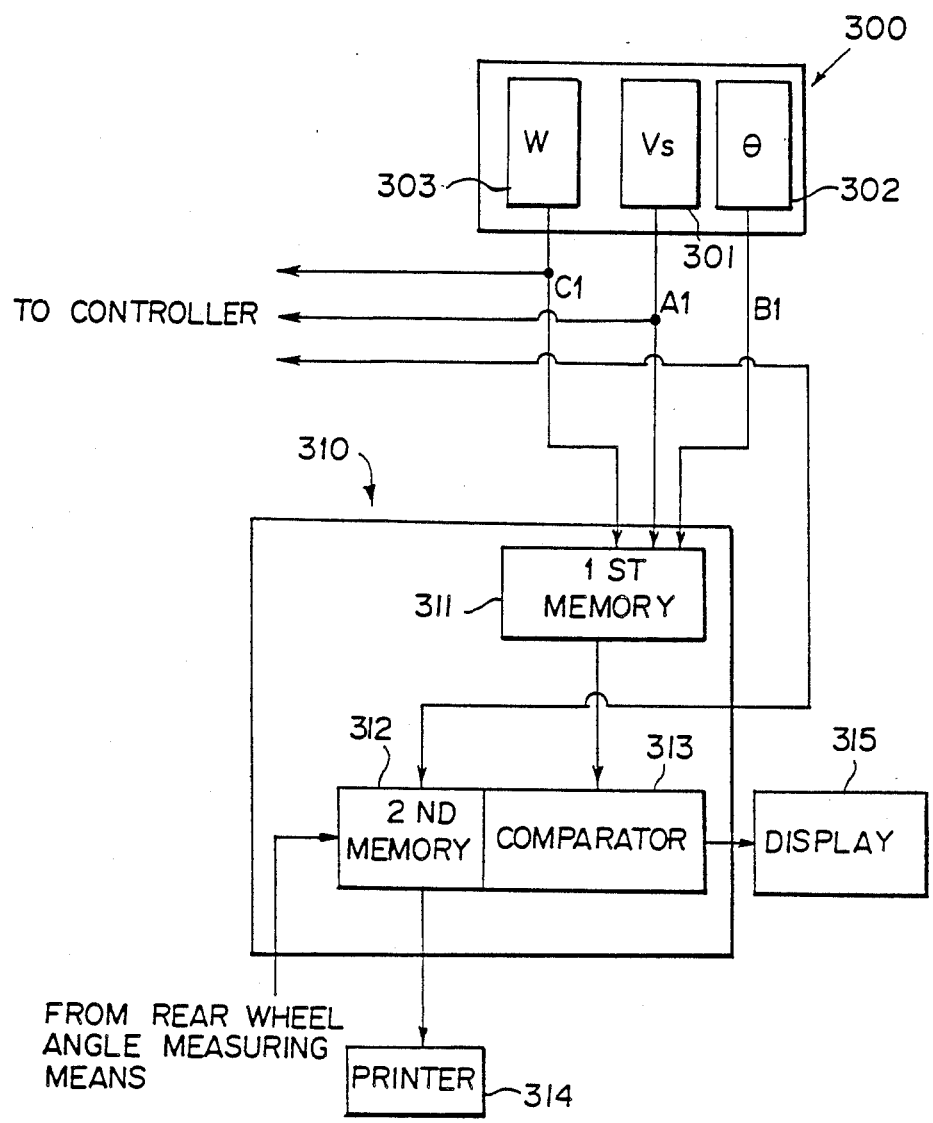
FIG. 24 is a schematic view illustrating a four-wheel steering characteristic checking apparatus in accordance with another embodiment of the present invention.

A four-wheel steering characteristic checking apparatus in accordance with another embodiment of the present invention which is adapted to check the four-wheel steering system shown in FIG. 22 will be described with reference to FIG. 24, hereinbelow. The apparatus of this embodiment may be substantially the same mechanically as the embodiment shown in FIGS. 5 to 15 except that the front wheel static tester 41 is not necessary in this embodiment, and accordingly, only the part necessary for determining whether the front wheels and the rear wheels are actually turned according to the preset four-wheel steering characteristics is described. In FIG. 24, the apparatus of this embodiment includes a simulation signal output means 300 comprising a vehicle speed signal generating section 301 which outputs a simulation 20 vehicle speed signal A1 representing a vehicle speed $V_s$, a front wheel turning angle signal generating section 302 which outputs a simulation front wheel turning angle signal A1 representing a front wheel turning angle $\theta$, and a vehicle load signal generating section 303 which outputs a simulation load signal C1 representing load on the vehicle. The simulation signals A1, B1 and C1 are input into the respective input terminals 216a, 216b and 216c of the controller 216 of the four-wheel steering system (FIG. 22) and into a first memory 311 of a checking section 310. The checking section 310 further includes a second memory 312 and a comparator 313. The second memory 312 stores a continuous signal output from the rear wheel angle measuring means 160 of the four-wheel steering system and inputs the stored continuous signal into the comparator 313 and printer 314 upon receipt of a simulation signal end signal from the front wheel turning angle signal generating section 302. (The simulation signal end signal may be output from the other signal generating sections at the ends of the respective signals, or may be manually input by the operator.) Thereafter the second memory 312 is reset. The first memory 311 stores preset four-wheel steering characteristics and selects preset rear wheel turning angle characteristics on the basis of the factors represented by the simulation signals A1, B1 and C1, and inputs the selected rear wheel turning angle characteristics into the comparator 313 upon receipt of a simulation signal end signal from the front wheel turning angle signal generating section 302. The comparator 313 compares the stored continuous signal with the selected rear wheel turning angle characteristics and outputs the result of the comparison to a display device 315. When it is determined that the actual rear wheel turning angle characteristics represented by the stored continuous signal deviate from the selected rear wheel turning angle characteristics, the data output from the printer 314 is used for adjustment of the four-wheel steering characteristics.

For example, in order to check the rear wheel turning angle characteristics under an 80 Kg load in the condition in which the rear wheels are turned in the opposite direction to the front wheels by a largest angle, a simulation vehicle speed signal A1 is set to represent 0 Km/h at which the absolute value of the rear wheel turning angle ratio is maximum, a simulation front wheel turning angle signal B1 is set to represent that the steering wheel is turned to the maximum from the neutral position and returned to the neutral position at a predetermined angular velocity, and a simulation load signal C1 is set to represent 80 Kg. Then, in order to index an origin of the measurement of the rear wheel turning angle, for instance, a simulation front wheel turning angle signal representing that the front wheels are in the straight-ahead position is input into the controller of the four-wheel steering system thereby setting the rear wheels to the straight-ahead position. In this, case the origin of the measurement of the rear wheel turning angle is at the straight-ahead position. Thereafter, the simulation signals A1, B1 and C1 set as described above are input into the controller and the first memory 311, and the actual rear wheel turning angle characteristics are measured by the rear wheel angle measuring means 160 and stored in the second memory 312. The first memory 311 selects preset rear wheel turning angle characteristics from the stored four-wheel steering characteristics on the basis of the factors represented by the simulation signals A1, B1 and C1, and inputs the selected rear wheel turning angle characteristics into the comparator 313 upon receipt of the simulation signal end signal from the front wheel turning angle signal generating section 302. At the same time, the second memory 312 inputs the stored actual rear wheel turning angle characteristics into the comparator 313. The comparator 313 compares the information input from the first memory 311 and that input from the second memory 312 and outputs the result of the comparison to the display device 315.

Instead of once storing the actual rear wheel turning angle characteristics measured by the rear wheel angle measuring means 160 in the second memory 312, the output of the rear wheel angle measuring means 160 may be continuously input into the comparator 313. In this case, the selected rear wheel turning angle characteristics should be continuously input into the comparator 313. Further, it is preferred that the kind of check to be effected be input into the first memory 311 from the simulation signal output means 300 prior to the check.

Figure 25:
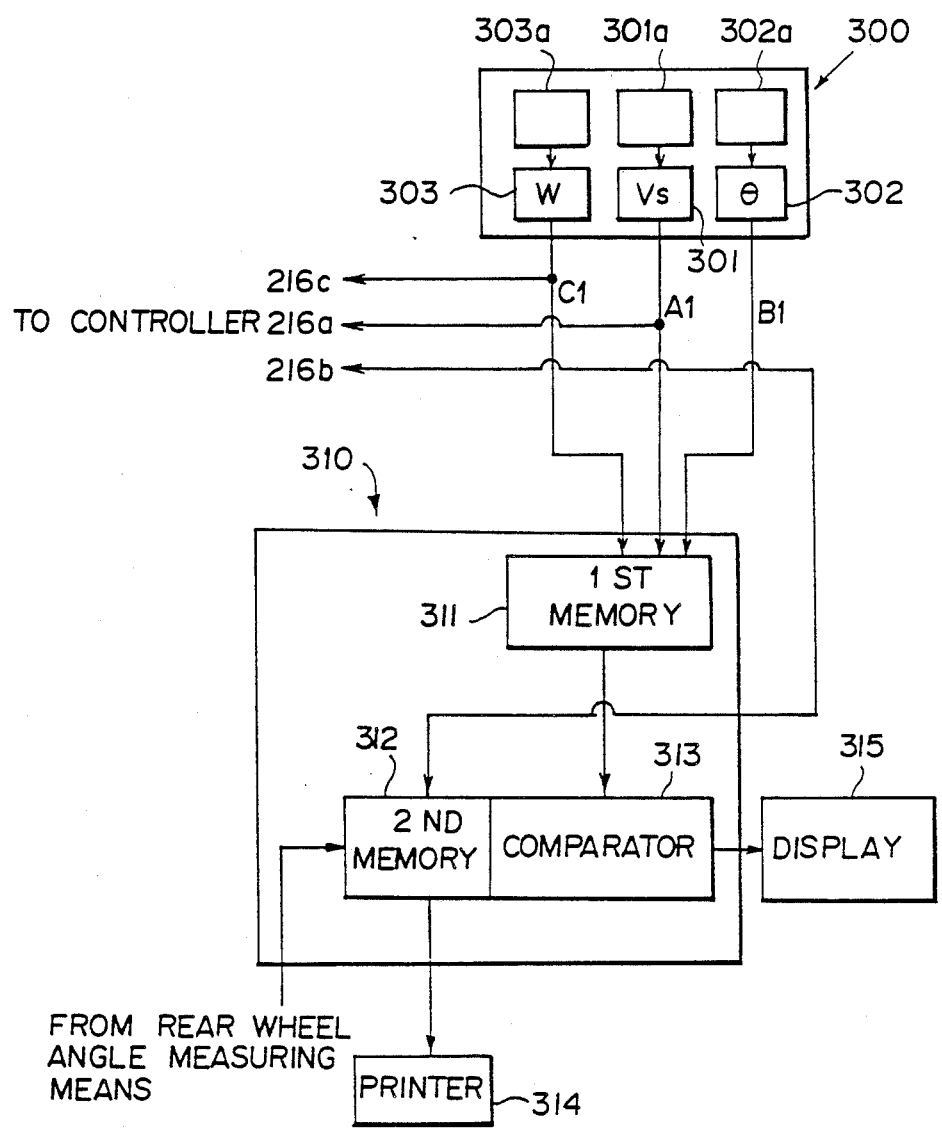
FIG. 25 is a schematic view showing a modification of the embodiment shown in FIG. 24.

FIG. 25 shows a modification of the embodiment shown in FIG. 24. In the modification shown in FIG. 25, the simulation signal generating sections 301 to 303 are respectively provided with memories 301a to 303a in which are stored a plurality of simulation signals corresponding to a plurality of kinds of checks to be effected, and the simulating signal generating sections 301 to 303 output the simulation signals stored in the respective memories in a predetermined order at predetermined intervals. The first memory 311 outputs selected rear wheel turning angle characteristics under the control of the check start signal and the check end signal output from one of the simulation signal generating sections between outputs of different simulation signals from the section. More particularly, before the sumulation signals A1, B1 and C1 corresponding to a certain kind of check are respectively output from the simulation signal generating section 301 to 303, a signal for indexing the origin of measurement of the rear wheel turning angle is input into the controller of the four-wheel steering system and to the first memory 311. Upon receipt of the signal, the first memory 311 prepares for output of the selected rear wheel turning angle characteristics. After the simulation signals A1, B1 and C1 corresponding to the check are input into the controller and the first memory 311 and the actual rear wheel turning angle characteristics are measured, the check end signal is input into the first and second memories 311 and 312 to start the comparison in the comparator 313.

In the description made above with reference to FIGS. 24 and 25, the vehicle load is employed as the factor for changing the four-wheel steering characteristics, and accordingly, the simulation load signal is output from the simulation signal output means 300. However, other simulation signals may be output from the simulation signal out means 300 according to the factor which is employed as the factor for changing the four-wheel steering characteristics in the particular four-wheel steering system to be checked.

The present invention can be applied to a four-wheel system in which turn of the front wheels is mechanically transmitted to the rear wheels to turn the rear wheels in response to turn of the front wheels and the rear wheel turning angle ratio characteristics are mechanically controlled.

Though the present invention has been described above in conjunction with four-wheel steering systems in which the rear wheels are turned in the same direction as the front wheels and in the opposite direction to the front wheels according to the vehicle speed, the present invention can be applied to four-wheel steering systems in which the rear wheels are turned only in the same direction as the front wheels or only in the direction opposite to the front wheels under a predetermined condition.

We claim:

1. A method of checking four-wheel steering characteristics of a four-wheeled vehicle provided with a four-wheel steering system in which both the front wheels and the rear wheels are turned in response to operation of the steering wheel according to preset four-wheel steering characteristics, comprising the steps of:

changing the four-wheel steering characteristics according to a factor which can affect running of the vehicle by inputing a simulation signal representing said factor into a controller for determining the rear wheel angle turning the front wheels, measuring the actual turning angle of at least one of the front wheels and the actual turning angle of at least one of the rear wheels by which the rear wheel is turned in response to the turning of the front wheels and as determined by said controller on the basis of said simulation signal, thereby detecting the actual relation between the turning angles of the front and rear wheels, and checking whether the actual four-wheel steering characteristics of the vehicle deviate from the preset four-wheel steering characteristics by comparing the actual relation between the turning angles of the front and rear wheels with the preset four-wheel steering characteristics.

2. A method as defined in claim 1 in which said preset four-wheel steering characteristics include a plurality of rear wheel turning angle ratio characteristics to be selected according to the factor, and in which said simulation signal is input into the controller when the front wheels are turned.

3. A method as defined in claim 2 in which said four-wheel steering system is provided with a rear wheel turning angle ratio changing mechanism which changes the rear wheel turning angle ratio under the control of the controller, the rear wheel turning angle ratio being the ratio of the rear wheel turning angle to the front wheel turning angle, the ratio when the rear wheels are turned in the same direction as the front wheels being defined to be positive and the ratio when the rear wheels are turned in the direction opposite to the front wheels being defined to be negative.

4. A method as defined in claim 3 in which said controller has a vehicle speed sensor for detecting the vehicle speed, said preset four-wheel steering characteristics including a plurality of rear wheel turning angle ratio characteristics to be selected according to the vehicle speed, and a simulation vehicle speed signal representing a vehicle speed is input into the controller when the front wheels are turned.

5. A method as defined in claim 4 in which a simulation vehicle speed signal representing vehicle speed continuously changing in a predetermined pattern is input into the controller after the front wheels are turned and the rear wheels are turned in response to the turning of the front wheel, and the change in the rear wheel turning angle with the vehicle speed is measured and is checked referring to the preset four-wheel steering characteristics.

6. A method as defined in claim 4 in which a simulation vehicle speed signal representing a vehicle speed at which the rear wheels are turned in the direction opposite to the front wheels and the absolute value of the rear wheel turning angle ratio is maximized is input into the controller.

7. A method as defined in claim 4 in which a simulation vehicle speed signal representing a vehicle speed at which the rear wheels are not turned in either direction irrespective of the turning angle of the front wheels is input into the controller.

8. A method as defined in claim 4 in which a simulation vehicle speed signal representing a vehicle speed at which the rear wheels are turned in the same direction as the front wheels and the absolute value of the rear wheel turning angle ratio is maximized is input into the controller.

9. A method as defined in claim 3 in which said factor is the load on the vehicle.

10. A method as defined in claim 3 ih which said vehicle is provided with a four-wheel drive system having a torque distribution changing mechanism, and said factor is the torque distribution.

11. A method as defined in claim 3 in which said factor is the altitude of the vehicle body.

12. A method as defined in claim 3 in which said factor is the steering wheel operating speed.

13. A method as defined in claim 3 in which said factor is the road gripping force of the tires.

14. A method as defined in claim 3 in which said factor is the lateral acceleration acting on the vehicle.

15. A method as defined in claim 3 in which said factor is the inclination of the road surface.

16. A method as defined in claim 3 in which said factor is the friction coefficient of the road surface.

17. A method of checking four-wheel steering characteristics of a four-wheeled vehicle provided with a four-wheel steering system in which both the front wheels and the rear wheels are tuned in response to operation of the steering wheel according to preset four-wheel steering characteristics, comprising steps of turning the front wheels, measuring the actual turning angle of at least one of the front wheels and the actual turning angle of at least one of the rear wheels by which the rear wheel is turned in response to the turning of the front wheels, thereby detecting the actual relation between the turning angles of the front and rear wheels, and checking whether the actual four-wheel steering characteristics of the vehicle deviate from the preset four-wheel steering characteristics by referring the actual relation between the turning angles of the front and rear wheels to the preset four-wheel steering characteristics; wherein said four-wheel steering system is arranged so that an insensitive zone in which the rear wheels are not turned even if the front wheels are turned is produced when the front wheel turning angle and the rear wheel turning angle are both substantially equal to 0, and in which the front wheels are turned left and right from the straight-ahead position, and the front wheel turning angle and the rear wheel turning angle at this time are measure, and whether the middle of the insensitive zone substantially coincides with the straight-ahead position of the front wheels is checked.

18. A method as defined in claim 17 in which the front wheels are turned left and right from the straight-ahead position while the front wheel turning angle and the rear wheel turning angle are measured, the change of the measured rear wheel turning angle with the change of the measured front wheel turning angle is graphed with the front wheel turning angle as the abscissa and the rear wheel turning angle as the ordinate, and whether the curve representing the change of the rear wheel turning angle with the change of the measured front wheel turning angle obtained when the front wheels are turned left and that obtained when the front wheels are turned right are symmetrical about the origin is checked.

19. A method as defined in claim 17 in which said four-wheel steering system is provided with a fail-safe mechanism for fixing the rear wheels to the straight-ahead position irrespective of the front wheel turning angle when any failure in the mechanism for turning the rear wheels is detected, and in which said fail-safe mechanism is actuated after the step of turning the front wheels and prior to the step of measuring the actual turning angle of the front and rear wheels.

20. A method as defined in claim 17, in which a simulation vehicle speed signal representing a vehicle speed at which the rear wheels are turned in the direction opposite to the front wheels and the absolute value of the rear wheel turning angle ratio is maximized is input into the controller.

21. An apparatus for checking four-wheel steering characteristics of a four-wheeled vehicle provided with a four-wheel steering system in which both the front wheels and the rear wheels are turned in response to operation of the steering wheel according to preset four-wheel steering characteristics, comprising a front wheel turning angle measuring means for measuring the turning angle of at least one of the front wheels when the front wheels are turned, a rear wheel turning angle measuring means for measuring the turning angle of at least one of the rear wheels by which the rear wheel is turned in response to the turning of the front wheels, and
a comparator means for detecting the actual relation between the turning angles of the front and rear wheels on the basis of data input from the front wheel turning angle measuring means and the rear wheel turning angle measuring means and determining whether the actual four-wheel steering characteristics of the vehicle deviate from the preset four-wheel steering characteristics by referring the actual relation between the turning angles of the front and rear wheels to the preset four-wheel steering characteristics.

22. An apparatus as defined in claim 21 in which said four-wheel steering system is provided with a rear wheel turning angle ratio changing mechanism which changes the rear wheel turning angle ratio under the control of a controller, the rear wheel turning angle ratio being the ratio of the rear wheel turning angle to the front wheel turning angle, the ratio when the rear wheels are turned in the same direction as the front wheels being defined to be positive and the ratio when the rear wheels are turned in the direction opposite to the front wheels being defined to be negative.

23. An apparatus as defined in claim 22 in which said controller of the four-wheel steering system has a sensor for detecting a factor which can affect running of the vehicle, said preset four-wheel steering characteristics including a plurality of rear wheel turning angle ratio characteristics to be selected according to the factor, and which further comprises a simulation signal output means for inputting a simulation signal representing said factor into the controller.

24. An apparatus as defined in claim 23 in which said controller of the four-wheel steering system has a vehicle speed sensor for detecting the vehicle speed, said preset four-wheel steering characteristics including a plurality of rear wheel turning angle ratio characteristics to be selected according to the vehicle speed, and which further comprises simulation vehicle speed signal output means for inputting a simulation vehicle speed signal representing a vehicle speed into the controller.

25. An apparatus as defined in claim 24 in which said simulation vehicle speed signal output means inputs into the controller a simulation vehicle speed signal representing a vehicle speed at which the rear wheels are turned in the direction opposite to the front wheels and the absolute value of the rear wheel turning angle ratio is maximized.

26. An apparatus as defined in claim 24 in which said simulation vehicle speed signal output means inputs into the controller a simulation vehicle speed signal representing a vehicle speed at which the rear wheels are not turned in either direction irrespective of the turning angle of the front wheels.

27. An apparatus as defined in claim 24 in which said simulation vehicle speed signal output means inputs into the controller a simulation vehicle speed signal representing a vehicle speed at which the rear wheels are turned in the same direction as the front wheels and the absolute value of the rear wheel turning angle ratio is maximized.

28. An apparatus as defined in claim 23 in which said factor is the load on the vehicle.

29. An apparatus as defined in claim 23 in which said vehicle is provided with a four-wheel drive system having a torque distribution changing mechanism, and said factor is the torque distribution.

30. An apparatus as defined in claim 23 in which said factor is the altitude of the vehicle body.

31. An apparatus as defined in claim 23 in which said factor is the steering wheel operating speed.

32. An apparatus as defined in claim 23 in which said factor is the road gripping force of the tires.

33. An apparatus as defined in claim 23 in which said factor is the lateral acceleration acting on the vehicle.

34. An apparatus as defined in claim 23 in which said factor is the inclination of the road surface.

35. An apparatus as defined in claim 23 in which said factor is the friction coefficient of the road surface.

36. An apparatus as defined in claim 21 in which said front wheel turning angle measuring means comprises a pair of front wheel turntables on which the respective front wheels are placed and which are supported for turn together with the front wheels, at least one of the turntables being provided with a touch sensor which is adapted to abut against the side surface of the corresponding front wheel placed on the turn table to measure the turning angle of the front wheel and a turning angle detecting means for detecting the turning angle of the front wheel turntables, said touch sensor being arranged to measure the turning angle of the front wheel within a predetermined angle range on each side of the straight-ahead position of the front wheel, and said rear wheel turning angle measuring means comprises a touch sensor which is adapted to abut against the side surface of the corresponding rear wheel to measure the turning angle of the rear wheel.

37. An apparatus as defined in claim 21 which further comprises a pair of full-float type front turntables for supporting the respective front wheels to be able to turn and to be movable back and forth, a pair of full-float type rear turntables for supporting the respective rear wheels to be able to turn and to be movable back and forth, and a vehicle body holding means which fixedly holds the vehicle body with the front wheels and the rear wheels supported on the respective turntables.

38. An apparatus as defined in claim 21 which further comprises a pair of full-float type front turntables for supporting the respective front wheels to be able to turn, a pair of full-float type rear turntables for supporting the respective rear wheels to be able to turn, and a vehicle body lifting means for lifting the vehicle body with the front wheels and the rear wheels supported on the respective turn tables.

39. An apparatus as defined in claim 21 which further comprises a pair of front turntables for supporting the respective front wheels to be able to turn, a pair of rear turntables for supporting the respective rear wheels to be able to turn, and a front turntable driving means for turning the front turntables to turn the front wheels thereon.

40. An apparatus as defined in claim 21 which further comprises a pair of front turntables for supporting the respective front wheels to be able to turn, a pair of rear turntables for supporting the respective rear wheels to be able to turn, the front turntables and/or the rear turn tables comprising full-float type turntables which are rotatable and movable left and right and back and forth, a position detecting means for detecting the position of the wheels supported on the full-float type turntables as seen in the longitudinal direction of the vehicle body, and a locator means for locating the turning angle measuring means for measuring the turning angle of the wheels on the full-float type turn tables on the basis of the position of the wheels detected by the position detecting means.

41. An apparatus for checking four-wheel steering characteristics of a four-wheeled vehicle provided with a four-wheel steering system having a front wheel turning mechanism for turning the front wheels in response to operation of the steering wheel, a rear wheel turning mechanism for turning the rear wheels, a front wheel turning angle sensor for detecting the front wheel turning angle, a controller which receives a front wheel turning angle signal from the front wheel turning angle sensor and controls the rear wheel turning mechanism to turn the rear wheels in response to operation of the steering wheel according to preset four-wheel steering characteristics, said apparatus comprising
  a simulation signal output means which is adapted to input a simulation front wheel turning angle signal representing a front wheel turning angle into the controller of the four-wheel steering system
  a rear wheel turning angle measuring means for measuring the turning angle of at least one of the rear wheels by which the rear wheel is actually turned under the control of the controller when said simulation front wheel turning angle is input into the controller, and
  a comparator means which detects the actual relation between the turning angles of the front and rear wheels on the basis of the simulation front wheel turning angle signal and data input from the rear wheel turning angle measuring means, and determines whether the actual four-wheel steering characteristics of the vehicle deviates from the preset four-wheel steering characteristics by referring the actual relation between the turning angles of the front and rear wheels to the preset four-wheel steering characteristics.

42. An apparatus as defined in claim 41 in which said controller of the four-wheel steering system has a sensor for detecting a factor which can affect running of the vehicle, said preset four-wheel steering characteristics including a plurality of rear wheel turning angle ratio characteristics to be selected by the controller according to the factor to control the rear wheel turning mechanism, and in which said simulation signal output means is arranged to further input a simulation signal representing said factor into the controller.

43. An apparatus as defined in claim 42 in which said controller has a first input section through which said front wheel turning angle signal is input into the controller from the front wheel turning angle sensor, and said simulation signal output means inputs the simulation front wheel turning angle signal through the first input section.

44. An apparatus as defined in claim 42 in which said controller of the four-wheel steering system has a vehicle speed sensor for detecting the vehicle speed, said preset four-wheel steering characteristics including a plurality of rear wheel turning angle ratio characteristics to be selected according to the vehicle speed, and in which said simulation signal output means is arranged to further input a simulation vehicle speed signal representing a vehicle speed into the controller.

45. An apparatus as defined in claim 43 in which said factor is the load on the vehicle.

46. An apparatus as defined in claim 42 in which said vehicle is provided with a four-wheel drive system having a torque distribution changing mechanism, and said factor is the torque distribution.

47. An apparatus as defined in claim 42 in which said factor is the altitude of the vehicle body.

48. An apparatus as defined in claim 42 in which said factor is the steering wheel operating speed.

49. An apparatus as defined in claim 42 in which said factor is the road gripping force of the tires.

50. An apparatus as defined in claim 42 in which said factor is the lateral acceleration acting on the vehicle.

51. An apparatus as defined in claim 41 in which said factor is the inclination of the road surface.

52. An apparatus as defined in claim 42 in which said factor is the friction coefficient of the road surface.

53. An apparatus as defined in claim 42 further comprising an origin indexing signal output means for inputting a signal for indexing the origin of measurement of the rear wheel turning angle into the controller at an interval between different kinds of check of the four-wheel steering characteristics.

54. An apparatus as defined in claim 53 in which said origin indexing signal is a simulation signal representing that the front wheels are in the straight-ahead position.

55. A method of checking four-wheel steering characteristics of a four-wheeled vehicle provided with a four-wheel steering system having a front wheel turning mechanism for turning the front wheels in response to operation of the steering wheel, a rear wheel turning mechanism for turning the rear wheels, a front wheel turning angle sensor for detecting the front wheel turning angle, a controller which receives a front wheel turning angle signal from the front wheel turning angle sensor and controls the rear wheel turning mechanism to turn the rear wheels in response to operation of the steering wheel according to preset four-wheel steering characteristics, said method comprising
  a step of inputting a simulation front wheel turning angle signal representing a front wheel turning angle into the controller of the four-wheel steering system
  a step of measuring the turning angle of at least one of the rear wheels by which the rear wheel is actually turned under the control of the controller when said simulation front wheel turning angle is input into the controller, and
  a step of detecting the actual relation between the turning angles of the front and rear wheels on the basis of the simulation front wheel turning angle signal and data input from the rear wheel turning angle measuring means, and determining whether the actual four-wheel steering characteristics of the vehicle deviates from the preset four-wheel steering characteristics by referring the actual relation between the turning angles of the front and rear wheels to the preset four-wheel steering characteristics.

56. A method as defined in claim 55 in which said controller of the four-wheel steering system as a sensor for detecting a factor which can affect running of the vehicle, said preset four-wheel steering characteristics including a plurality of rear wheel turning angle ratio characteristics to be selected by the controller according to the factor to control the rear wheel turning mechanism, and which further comprising a step of inputting a simulation signal representing said factor into the controller.

57. A method as defined in claim 56 in which said controller of the four-wheel steering system as a vehicle speed sensor for detecting the vehicle speed,said preset four-wheel steering characteristics including a plurality of rear wheel turning angle ratio characteristics to be selected according to the vehicle speed, and which further comprising a step of inputting a simulation vehicle speed signal representing a vehicle speed into the controller.

58. A method as defined in claim 55 further comprising a step of inputting a signal for indexing the origin of measurement of the rear wheel turning angle into the controller at an interval between different kinds of check of the four-wheel steering characteristics.

59. A method of checking four-wheel steering characteristics of a four-wheeled vehicle provided with a four-wheel steering system in which both the front wheels and the rear wheels are turned in response to operation of the steering wheel according to preset four-wheel steering characteristics, comprising steps of turning the front wheels, measuring the actual turning angle of at least one of the front wheels and the actual turning angle of at least one of the rear wheels by which the rear wheel is turned in response to the turning of the front wheel, thereby detecting the actual relation between the turning angles of the front and rear wheels, and checking whether the actual four-wheel steering characteristics of the vehicle deviate from the preset four-wheel steering characteristics by referring the actual relation between the turning angles of the front and rear wheels to the preset four-wheel steering characteristics; wherein the front wheels are turned left and right from the straight-ahead position while the front wheel turning angle and the rear wheel turning angle are measured, the change of the measured rear wheel turning angle with the change of the measured front wheel turning angle is graphed with the front wheel turning angle as the abscissa and the rear wheel turning angle as the ordinate, and whether the curve representing the change of the rear wheel turning angle with the change of the measured front wheel turning angle obtained when the front wheels are turned left and that obtained when the front wheels are turned right are symmetrical about the origin is checked.

60. A method of checking four-wheel steering characteristics of a four-wheeled vehicle provided with a four-wheel steering system in which both the front wheels and the rear wheels are turned in response to operation of the steering wheel according to preset four-wheel steering characteristics, comprising steps of turning the front wheels, measuring the actual turning angle of at least one of the front wheels and the actual turning angle of at least one of the rear wheels by which the rear wheel is turned in response to the turning of the front wheels, thereby detecting the actual relation between the turning angles of the front and rear wheels, and checking whether the actual four-wheel steering characteristics of the vehicle deviate from the preset four-wheel steering characteristics by referring the actual relation between the turning angles of the front and rear wheels to the preset four-wheel steering characteristics; wherein said four-wheel steering system is provided with a fail-safe mechanism for fixing the rear wheels to the straight-ahead position irrespective of the front wheel turning angle when any failure in the mechanism for turning the rear wheels is detected, and in which said fail-safe mechanism is actuated after the step of turning the front wheels and prior to the step of measuring the actual turning angle of the front and rear wheels.

* * * * *